(12) United States Patent
Meshot et al.

(10) Patent No.: US 11,826,754 B2
(45) Date of Patent: Nov. 28, 2023

(54) FLUIDIC CARBON NANOTUBE DEVICE

(71) Applicant: LAWRENCE LIVERMORE NATIONAL SECURITY, LLC, Livermore, CA (US)

(72) Inventors: Eric R. Meshot, Oakland, CA (US); Steven Field Buchsbaum, Livermore, CA (US); Francesco Fornasiero, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 818 days.

(21) Appl. No.: 16/752,482

(22) Filed: Jan. 24, 2020

(65) Prior Publication Data

US 2020/0238284 A1 Jul. 30, 2020

Related U.S. Application Data

(60) Provisional application No. 62/797,063, filed on Jan. 25, 2019.

(51) Int. Cl.
*G01N 23/201* (2018.01)
*B01L 3/00* (2006.01)
(Continued)

(52) U.S. Cl.
CPC ... *B01L 3/502715* (2013.01); *B01L 3/502707* (2013.01); *C01B 32/168* (2017.08); *G01N 23/201* (2013.01); *B01L 2200/12* (2013.01); *B01L 2300/047* (2013.01); *B01L 2300/06* (2013.01); *B01L 2300/0627* (2013.01); *B01L 2300/0645* (2013.01);
(Continued)

(58) Field of Classification Search
CPC ............ G01N 23/201; B01L 3/502715; B01L 3/502707; C01B 32/168
See application file for complete search history.

(56) References Cited

U.S. PATENT DOCUMENTS 7,964,159 B2   6/2011 Bau et al.
9,725,315 B2   8/2017 Austin et al.
(Continued)

FOREIGN PATENT DOCUMENTS

JP   3219754 U   1/2019

OTHER PUBLICATIONS

Nanofluidic Transport through Isolated Carbon Nanotube channels: Advances, Controversies, and Challenges Shirui Guo, Eric R. Meshot, Tevye Kuykendall, Stefano Cabrini, Francesco Fornasiero Advanced Materials, 2015, 27, 5726-5737 (Year: 2015).*

(Continued)

*Primary Examiner* — Brian R Gordon
*Assistant Examiner* — Dwan A Gerido
(74) *Attorney, Agent, or Firm* — Foley & Lardner LLP

(57) ABSTRACT

Fluidic and electrofluidic devices comprising carbon nanotubes and methods of making and using the same are provided. The carbon nanotubes may be densely bundled to span an aperture in a substrate. A polymeric coating over the substrate may contain reservoir(s) etched therein, the reservoir(s) in fluid connectivity with the carbon nanotubes. X-rays may be directed through the aperture and fluid-filled carbon nanotubes with x-ray analysis providing data on fluid structure and dynamics inside the carbon nanotubes.

14 Claims, 14 Drawing Sheets

(51) Int. Cl.
    *C01B 32/168* (2017.01)
    *B82Y 15/00* (2011.01)
    *B82Y 40/00* (2011.01)

(52) U.S. Cl.
    CPC ... *B01L 2300/0896* (2013.01); *B01L 2300/12* (2013.01); *B82Y 15/00* (2013.01); *B82Y 40/00* (2013.01); *C01B 2202/08* (2013.01); *C01B 2202/34* (2013.01); *G01N 2223/635* (2013.01); *G01N 2223/647* (2013.01)

(56) References Cited

U.S. PATENT DOCUMENTS

2016/0061664 A1    3/2016    Wu et al.
2017/0184530 A1    6/2017    Scott et al.

OTHER PUBLICATIONS

Optical and electrical detection of single-molecule translocation through carbon nanotubes Weisi Song, Pei Pang, Jin He, Stuart Lindsay ACS Nano 2013, 7, 1, 689-694 (Year: 2013).*

Electronic Sensitivity of Carbon Nanotubes to Internal Water Wetting Di Cao, Pei Pang, Jin He, Tao Luo, Jae Hyun Park, Predrag Krstic, Colin Nuckolls, Jinyao Tang, and Stuart Lindsay ACS Nano 2011, 5,4, 3113-3119 (Year: 2011).*

Measurement of the Rate of Water Translocation through Carbon Nanotubes Xingcai Qin, Quanzi Yuan, Yapu Zhao, Shubao Xie, and Zhongfan Liu Nano Lett. 2011, 11, 5, 2173-2177 (Year: 2011).*

Origin of Giant Ionic Currents in Carbon Nanotube Channels Pei Pang, Jin He, Jae hyun Park, Predrag S. Krstic, and Stuart Lindsay ACS Nano 2011, 5, 9, 7277-7283 (Year: 2011).*

International Search Report and Written Opinion on PCT Application No. PCT/US2020/015096 dated May 18, 2020, 10 pages.

* cited by examiner

Figures 2A-E

Figures 6A-B
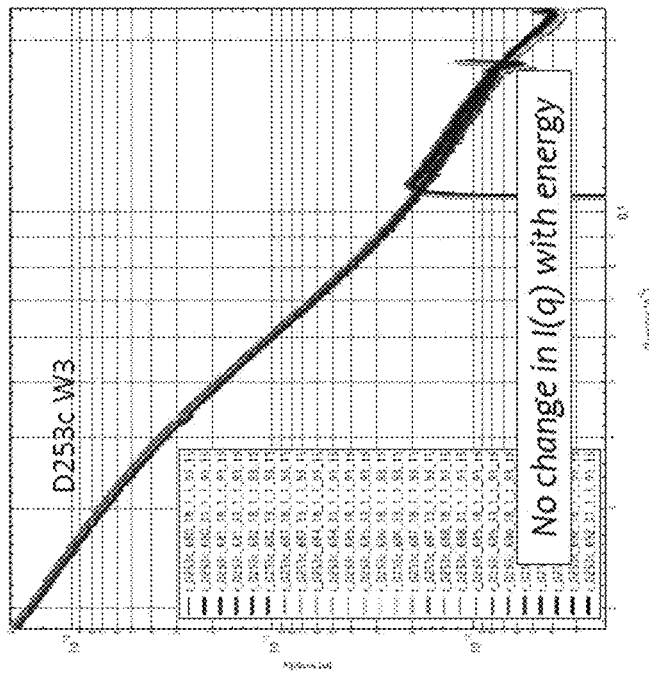
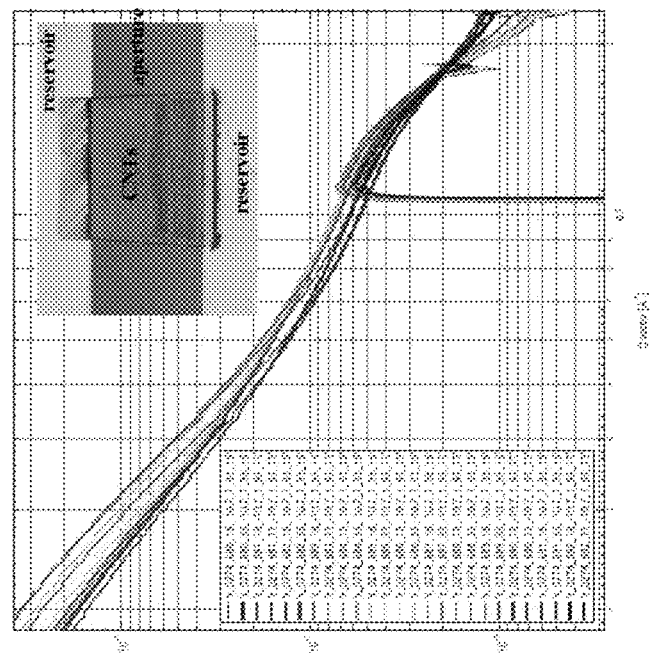

Figures 7 A-C
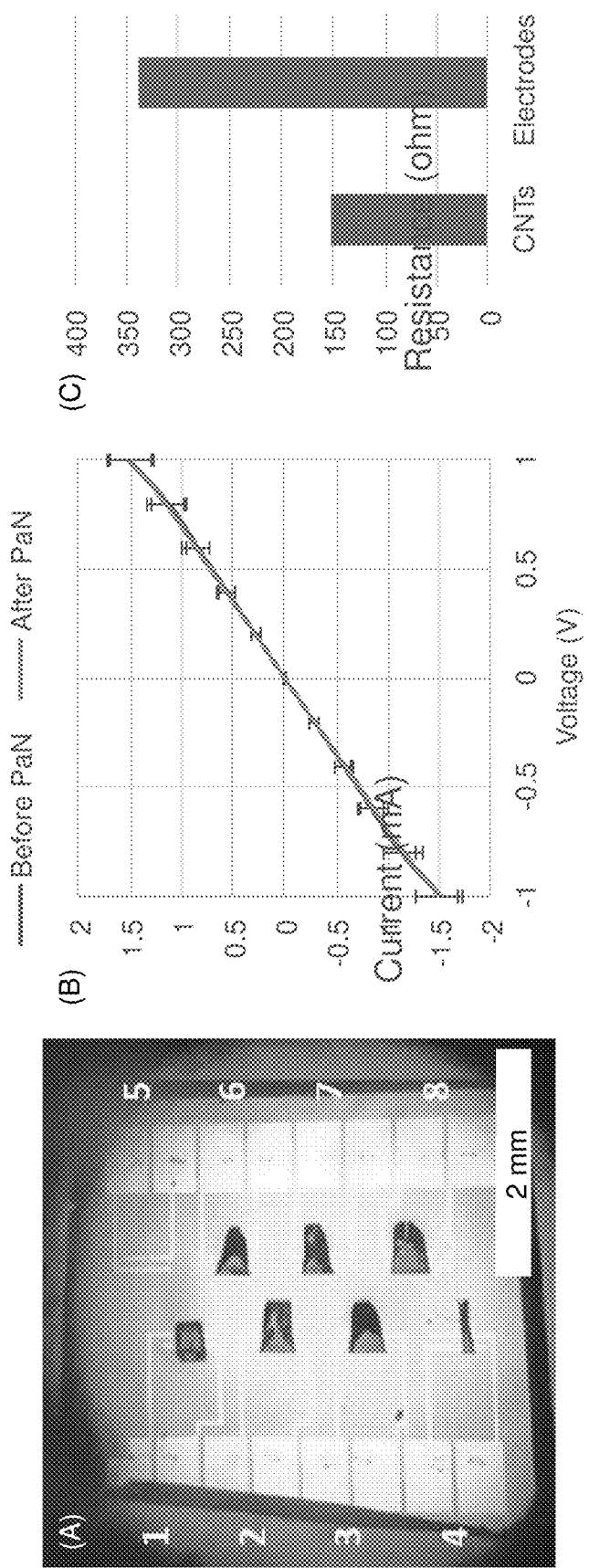

Figures 8A-B
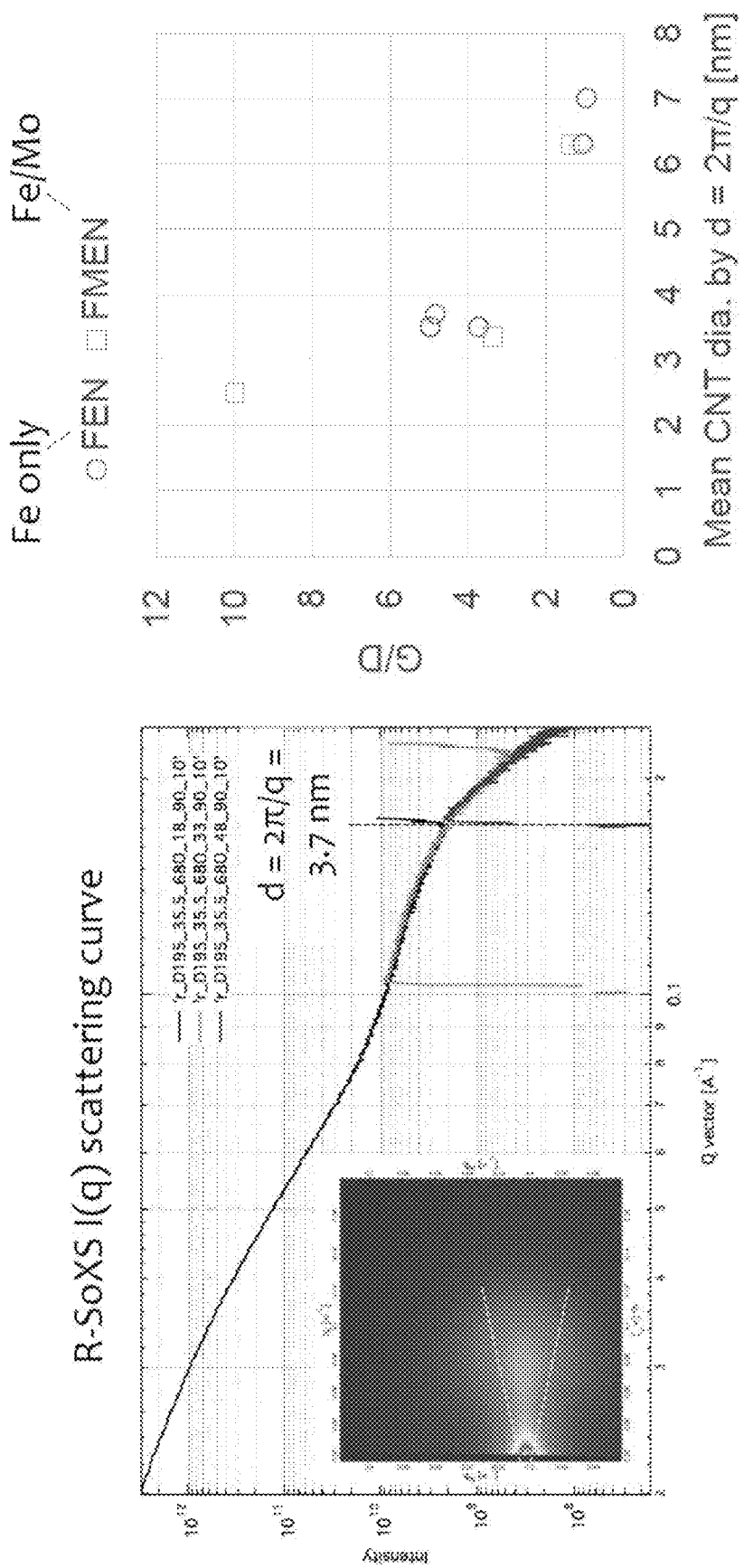

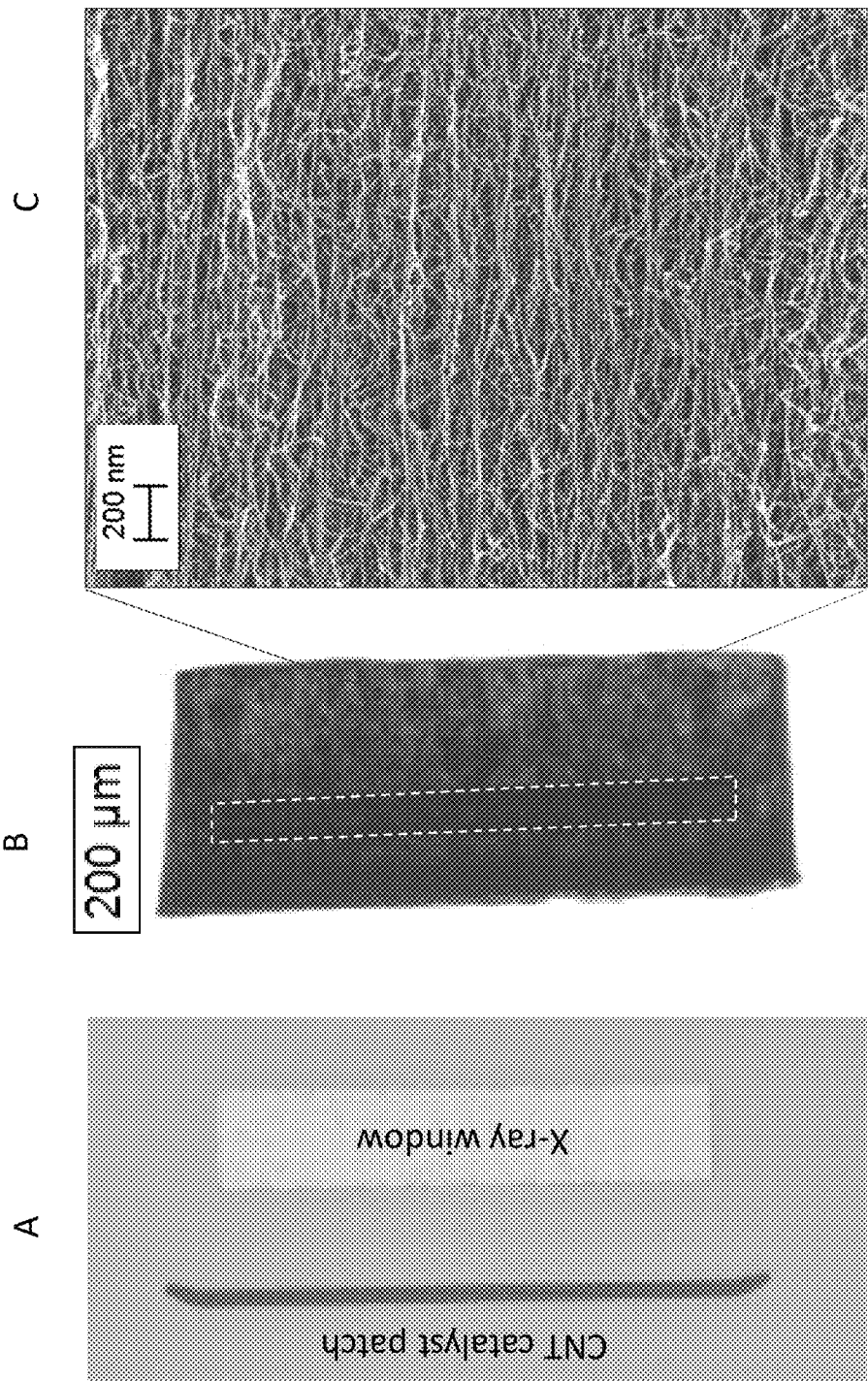
Figures 9A-C

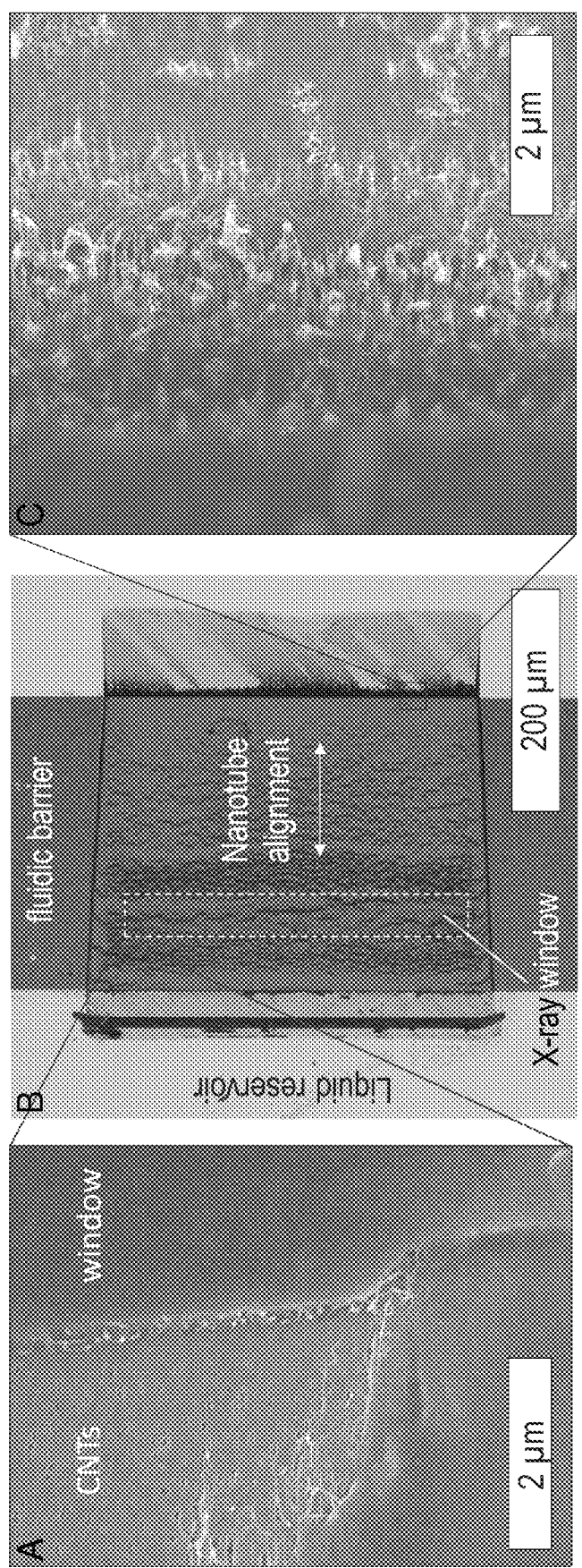
Figures 10A-C

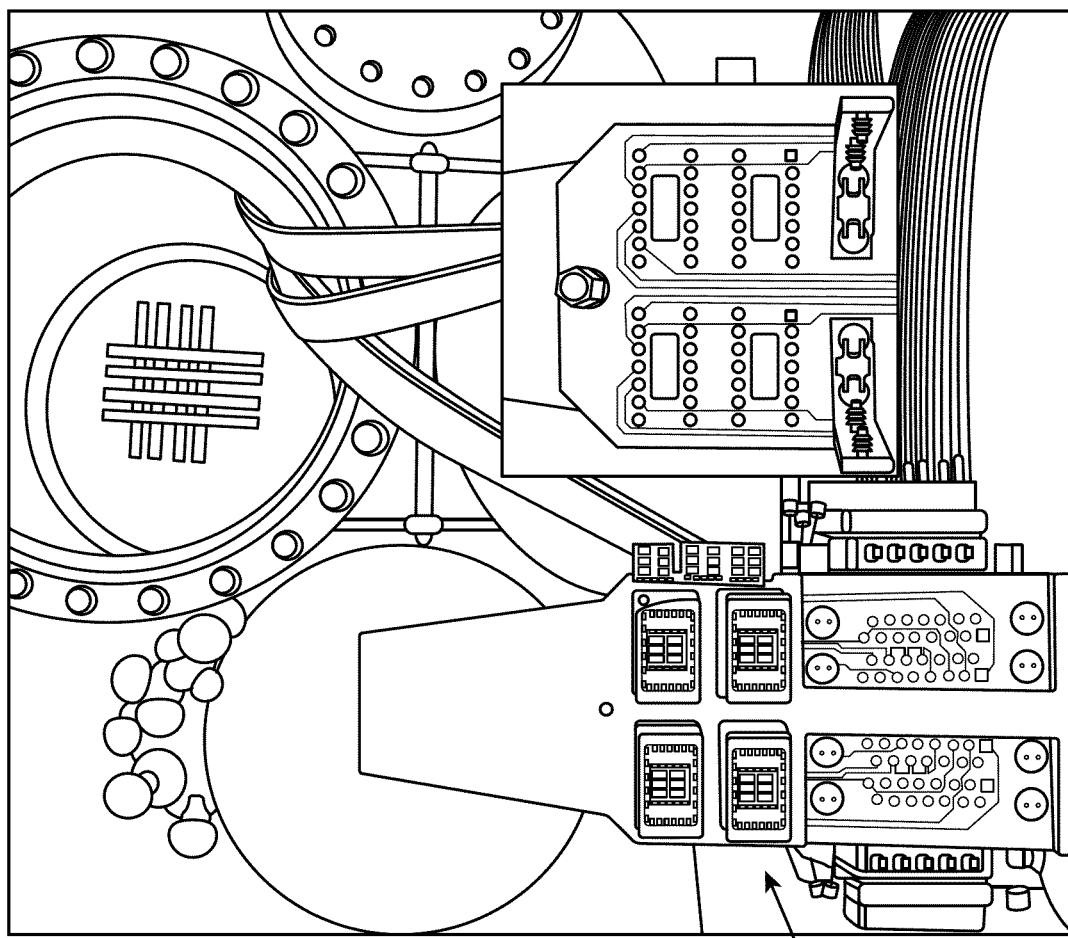
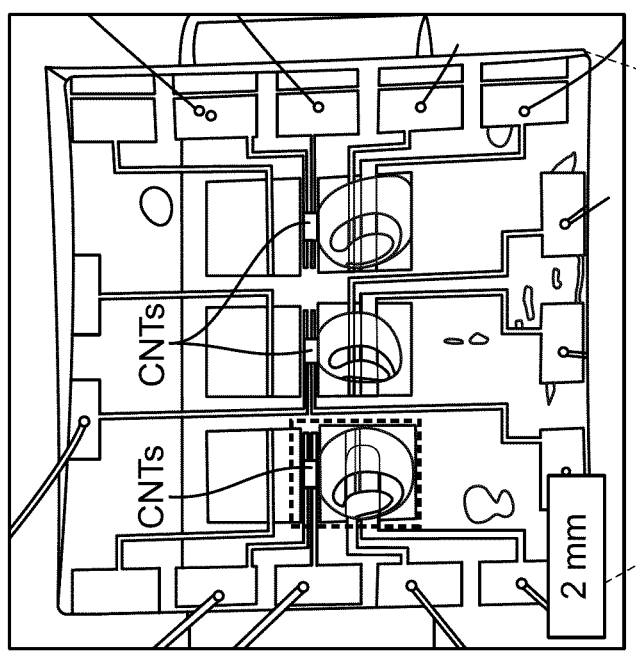
FIG. 11A
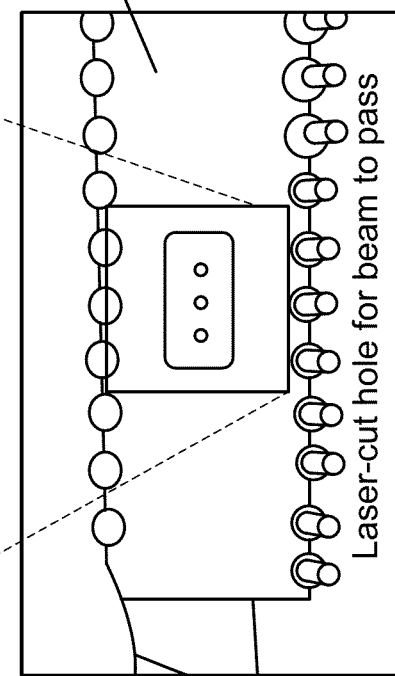
FIG. 11B
FIG. 11C

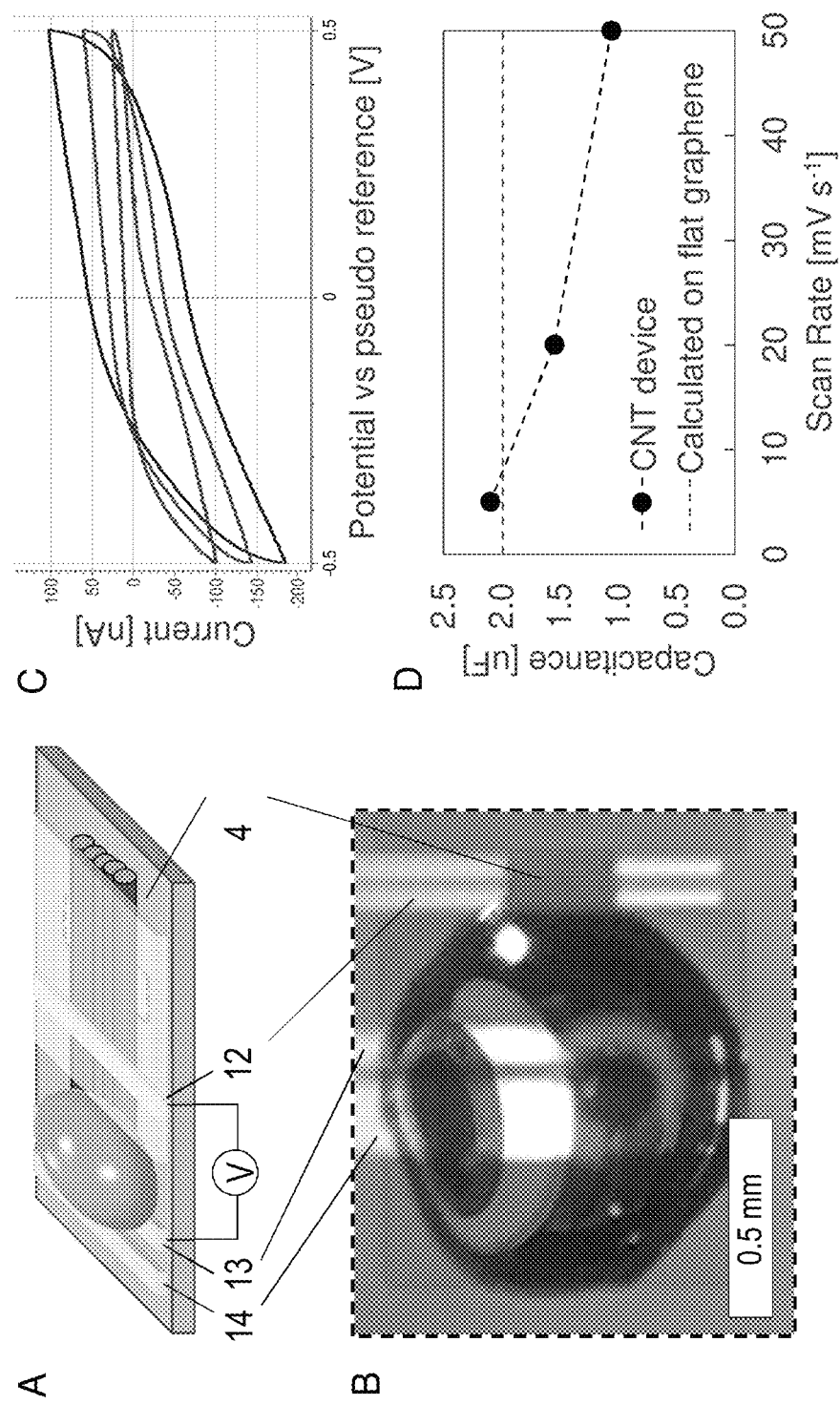
Figure 12A-D

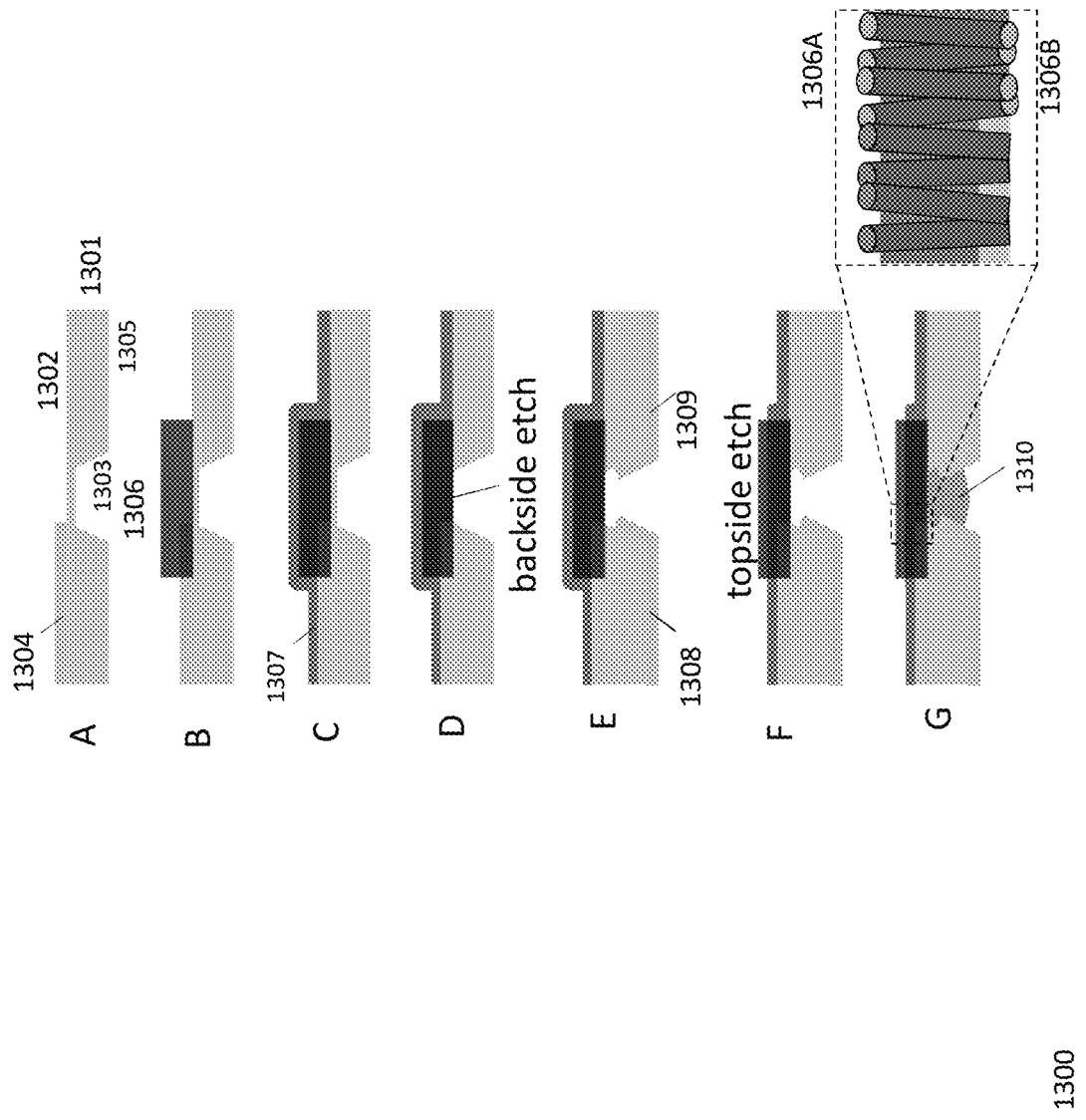
Figures 13A-G

FLUIDIC CARBON NANOTUBE DEVICE

CROSS-REFERENCE TO RELATED APPLICATION

The present application claims priority under 35 U.S.C. § 119(e) to U.S. provisional application Ser. No. 62/797,063, filed Jan. 25, 2019, which is incorporated herein by reference in its entirety.

STATEMENT OF GOVERNMENT SUPPORT

The United States Government has rights in the invention pursuant to Contract No. DE-AC52-07NA27344 between the U.S. Department of Energy and Lawrence Livermore National Security, LLC, for the operation of Lawrence Livermore National Laboratory. The United States Government has rights in this invention pursuant to Contract No. DE-AC02-05CH11231 between the United States Department of Energy and The Regents of the University of California for the operation of Lawrence Berkeley National Laboratory.

BACKGROUND

Electrochemical processes in nanostructured electrodes govern functionality in current and future batteries, supercapacitors, catalysis, solar-to-fuel devices, water purification, etc. Key challenges plaguing these application areas revolve around the movement of ions and/or molecules at interfaces and inside nano-spaces, where the physics may be different from bulk behavior and are poorly understood.

Carbon nanotubes (CNTs) are allotropes of carbon with a cylindrical nano structure and a hollow cylindrical core through which fluids may be passed. CNTs may be either metallic or semiconducting along their tubular axis. As such, they can potentially be used in an array of applications including electrical and electrobiological devices, analytical devices, batteries, and fluidic devices. However, fabricating arrays of CNTs with the appropriate length, uniformity, and packing density; and fabricating electronic devices from the CNT arrays remains a challenge using known dispersive techniques.

Fluids passing through the hollow cylindrical core and containing ionic species may display electrochemical dynamics at the fluid/inner-CNT interface that allow for capacitory, resistive, or transistive application of the CNTs. The ability to analyze these dynamic processes inside of the CNTs may be important for realizing their application in electrical devices.

Thus, a need exists in the art to CNT-containing devices that can be used to study the electrochemical dynamics inside of fluid filled CNTs, and the need for processes to produce the same devices. This disclosure satisfies this need and provides related advantages as well.

SUMMARY

The present disclosure provides a platform comprising dense, long nanotube channels that are fluidically and electrically integrated to enable in situ analysis of electrochemical processes via any number of probes, such as x-ray, electron, and/or UV-vis-IR probes. The nanotubes serve as model nanostructured electrode materials for confining, conducting, sensing, and ultimately characterizing arbitrary fluid(s), such as liquid(s) and/or gas(es), on the inner surfaces and volumes of the nanotubes only as they undergo electrochemical processes.

In one aspect, a fluidic device is provided, the fluidic device comprising, or consisting essentially of, or yet further consisting of, a substrate also comprising, or consisting essentially of, or yet further consisting of, a first face and a second face, the second face which is opposite to the first face and is separated from the first face by a distance defining a thickness; a first aperture through the substrate; a first plurality of equi-length, hollow carbon nanotubes (CNTs) arranged in parallel to each other and substantially perpendicular to the first face of the substrate, each CNT of the first plurality comprising an open input end and an open output end and wherein adjacent CNTs in the first plurality are in contact with one another, wherein: the first plurality of CNTs is a t×w array, wherein t, which represents a number of CNTs in a first direction parallel to the face of the substrate, is from 1 to about 5,000 and w, which represents a number of CNTs in a second direction parallel to the face of the substrate, is about 10 to about 50,000, wherein the first direction and the second direction are perpendicular to each other; a density of CNTs in the first plurality is from about $5 \times 10^{10}$ to about $5 \times 10^{12}$ CNTs $cm^{-2}$; In some embodiments, the input ends of the CNTs of the first plurality are flush with each other, in contact with the first face of the substrate. In some embodiments, the input ends are from about 0.1 to about 500 μm from the first aperture.

In some embodiments, the fluidic device further comprises, or consists essentially of, or yet further consists of: a $d^{th}$ aperture through the substrate, a $d^{th}$ plurality of equi-length, hollow carbon nanotubes (CNTs) arranged in parallel to each other and substantially perpendicular to the first face of the substrate, each CNT comprising an input end and an output end; adjacent CNTs in contact with one another, wherein: the $d^{th}$ plurality of CNTs is a $t_d \times w_d$ array, wherein $t_d$, which represents a number of CNTs in the $d^{th}$ plurality in the first direction, is from 1 to about 5,000 and $w_d$, which represents a number of CNTs in the $d^{th}$ plurality in the second direction, is about 10 to about 50,000; each $d^{th}$ plurality of CNTs has a density of CNTs independently selected from about $5 \times 10^{10}$ to about $5 \times 10^{12}$ $cm^{-2}$; and the input ends of each $d^{th}$ plurality of CNTs are flush with each other, in contact with the first face of the substrate, and from about 0.1 to about 500 μm from the $d^{th}$ aperture; wherein d is from 2 to about 500.

In another aspect, a fluidic device is provided, the fluidic device comprising: a substrate comprising a first face and a second face, the second face being opposite to the first face and is separated from the first face by a distance defining a thickness; a first aperture through the substrate; a first plurality of equi-length, hollow carbon nanotubes (CNTs) arranged in parallel to each other and in parallel to the first face of the substrate, each CNT comprising an input end and an output end; adjacent CNTs in contact with one another, wherein: the first plurality of CNTs is a t×w array, wherein t, which represents a number of CNTs in a first direction perpendicular to the first face of the substrate, is 1 to about 5,000, and w, which represents a number of CNTs in a second direction parallel to the first face of the substrate, is about 10 to about 50,000. In some embodiments, the density of CNTs in the first plurality is from about $5 \times 10^{10}$ to about $5 \times 10^{12}$ $cm^{-2}$; and the input ends are flush with each other; wherein from about 0.1% to 100% of the CNTs of the first plurality span the first aperture.

In some embodiments, the fluidic device further comprises, or consists essentially of, or yet further consists of: a $d^{th}$ aperture through the substrate, a $d^{th}$ plurality of equi-length carbon nanotubes (CNTs) arranged in parallel to each other and parallel to the first face of the substrate, each CNT comprising an input end and an output end; adjacent CNTs in contact with one another, wherein: the $d^{th}$ plurality of CNTs is a $t_d \times w_d$ array, wherein $t_d$, which represents a number of CNTs in the $d^{th}$ plurality in the first direction, is from 1 to about 5,000 and $w_d$, which represents a number of CNTs in the $d^{th}$ plurality in the second direction, is about 10 to about 50,000. In some embodiments, each $d^{th}$ plurality of CNTs has a density of CNTs independently selected from about $5 \times 10^{10}$ to about $5 \times 10^{12}$ cm$^{-2}$; the input ends of each $d^{th}$ plurality of CNTs are flush with each other; and wherein from about 0.1% to 100% of the CNTs of the $d^{th}$ plurality span the $d^{th}$ aperture, wherein the percentage of CNTs in each $d^{th}$ plurality spanning the $d^{th}$ aperture is selected independently of the percentage of CNTs in any other plurality spanning their respective aperture; wherein d is from 2 to about 500.

In some embodiments, the fluidic device is an electrofluidic device optionally comprising a first electrode contacting the device at a first point and a second electrode contacting the device at a second point.

In some embodiments, the fluidic device may be such that the first face of the substrate comprises a first electrode and a second electrode, which is parallel to the first electrode. The first and the second electrode may be oriented in a third direction, which is parallel to the first face of the substrate and substantially perpendicular the second direction. At least one of the first electrode or the second electrode may be in contact with the first plurality of CNTs.

In some embodiments, the fluidic device comprises one or more reservoirs, which may have, for example, a rectangular shape, wherein each reservoir is connected to the input ends or the output ends of the CNTs of any first through $d^{th}$ plurality of CNTs.

In some embodiments, the fluidic device may be such that the first face of the substrate comprises a reservoir containing a fluid, wherein the reservoir is fluidically connected to the input ends or the output ends of the CNTs of the first plurality of CNTs In some embodiments, the one or more reservoirs may be a photolithographed and/or plasma reactive ion etched reservoir, i.e. a reservoir formed in the first face of the substrate through photolithography and/or plasma reactive ion etching. In some embodiments, the one or more reservoirs may be formed in a polymer coating, such as a parylene layer, deposited on the first face of the substrate by, for example, etching apportion of the polymer layer. In some embodiments, each reservoir independently has a volume inside the first surface of the substrate between about $1.0 \times 10^{-4}$ µl and about $10 \times 10^{-4}$ µl. In some embodiments, each reservoir independently has a volume of about $3.75 \times 10^{-4}$ µl. The fluid may pin, thus a reservoir may contain a volume capacity for liquid greater than its volume formed inside the substrate under the level of the first face of the substrate. For example, the fluid in the reservoir may have a the fluid's circumference may exceed the level formed by the first face of the substrate. In some embodiments the reservoirs each have a volume capacity of about 0.1 µl to about 3 µl. In some embodiments, the volume capacity is about 1 µl.

In some embodiments, the first surface of the substrate may include an electrically insulating layer. For example, in some embodiments, the substrate may be coated with an electrical insulator, such as silicon nitride, silicon oxynitiride or silicon oxide. In some embodiments, the thickness of the electrically insulating coating may be from about 50 to about 500 nm.

In some embodiments, a characteristic dimension, such as the diameter or length, of an aperture, such as the first aperture or the $d^{th}$ aperture, is independently selected from about 1 to about 1,000 µm.

In some embodiments, the fluidic device further comprises a polymer coating, which cover at least a portion of an outer surface the CNTs arranged parallel to the first face of the substrate, at least a portion of the first face of the substrate, and optionally at least a portion of a reservoir. In some embodiments, the polymer coating is a chemical vapor deposited polymer coating. In some embodiments, the polymer coating may comprise parylene. In some embodiments, the substrate has been removed from the rest of the fluidic device and replaced with a second substrate.

In some embodiments, a plurality of CNTs, such as the first or the $d^{th}$ plurality of CNTs, may comprise a fluid, such as a liquid or gas, in an inner volume of its CNTs. In some embodiments, one or more pluralities of CNTs comprise an electrolytic fluid, such as an electrolytic liquid or gas, in an inner volume of its CNTs. In some embodiments, one or more pluralities of CNTs comprise an ionic fluid, such as an ionic liquid or gas, in an inner volume of its CNTs.

In some embodiments, the fluidic device further may comprise an energy source configured to direct an energy beam through one or more apertures. In some embodiments, the energy beam is one or more of an x-ray beam, a neutron beam, or an electron beam. In some embodiments, the fluidic device further comprises one or more detectors configured to detect the energy beam after its scattering from one or more pluralities of CNTs. For example, in some embodiments, the one or more detectors is one or more of an X-ray beam detector, a neutron detector, or an electron beam detector. In some embodiments, the one or more detectors are each independently UV-Vis spectroscopy, Fourier transform infrared spectroscopy (FTIR), Raman spectroscopy, transmission electron microscope (TEM), a scanning electron microscope (SEM), and x-ray absorption spectroscopy, or x-ray computerized tomography (CT).

In some embodiments, a width, i.e. a dimension parallel to the first face of the substrate but perpendicular to a nanotube length, of each plurality of CNTs, which is arranged parallel to the first face of the substrate, is less than 500 µm wide. In some embodiments, a length of the CNTs in each plurality of CNTs is independently selected between about 1 and 1,000 µm. In some embodiments, the input ends and/or the output ends of the CNTs in each plurality of CNTs are etched to open.

In another aspect, a method of spanning an aperture in a substrate with CNTs is provided, the method comprising, or alternatively consisting essentially of, or yet further consisting of obtaining a substrate comprising a first face and a second face, the second face which is opposite to the first face and is separated from the first face by a distance defining a thickness, a first aperture through the substrate, a plurality of equi-length, carbon nanotubes (CNTs) arranged in parallel to each other and substantially perpendicular to the first face of the substrate and realigning the plurality of CNTs, parallel to the first face of the substrate over the aperture. In some embodiments, the realigning comprises rolling a cylindrical rolling pin on the substrate towards the aperture and over the plurality of CNTs, such as the first plurality of CNTs or the $d^{th}$ plurality of CNTs, thereby realigning the CNTs over the aperture.

In some embodiments, a method of making the fluidic device of any embodiment herein is provided, the method comprising obtaining a substrate comprising a first face and a second face, the second face which is opposite to the first face is separated from the first face by a distance defining a thickness, a first aperture through the substrate, a plurality of equi-length, carbon nanotubes (CNTs) arranged in parallel to each other and substantially perpendicular to the first face of the substrate and realigning the plurality of CNTs, such as the first plurality of CNTs or the $d^{th}$ plurality of CNTs, parallel to the first face of the substrate over the aperture. In some embodiments, the realigning may comprise rolling a cylindrical rolling pin on the substrate towards the aperture and over the plurality of CNTs, thereby realigning the CNTs over the aperture.

In some embodiments, a method of forming a fluidic device comprising: forming a first aperture though a substrate comprising a first face and a second face, which is opposite to the first face is separated from the first face by a distance defining a thickness; synthesizing or depositing on the first face of the substrate a plurality of equi-length, hollow carbon nanotubes (CNTs) arranged in parallel to each other and substantially perpendicular to the first face of the substrate; and realigning the plurality of CNTs, parallel to the first face of the substrate over the aperture. In some embodiments, the realigning may comprise rolling a cylindrical rolling pin on the first face of the substrate towards the aperture over the plurality of CNTs arranged in parallel to each other and substantially perpendicular to the first face of the substrate.

In some embodiments, a method of analyzing the dynamics of a fluid inside of a CNT comprises directing an energy beam, such as an X-ray beam through an aperture in a substrate comprising a first face and a second face, which is opposite to the first face and is separated from the first face by a distance defining a thickness, on a plurality of equi-length hollow carbon nanotubes (CNTs) arranged on the first face of the substrate over the aperture parallel to each other and parallel to the first face of the substrate, wherein an inner volume of the CNTs contains a fluid; and detecting the energy beam after scattering from the plurality of CNTs In some embodiments, the methods further comprise, or consist essentially of, or further consist of, coating the substrate and the plurality of CNTs, such as the first plurality or the $d^{th}$ plurality, which are aligned parallel to the first face of the substrate, with a polymer. In some embodiments, the methods further comprise etching the polymer coating to create one or more reservoirs in fluid connectivity with an input end and/or an output end of the CNTs. In some embodiments, the methods further comprise filling one or more reservoirs with a fluid, such as a liquid or a gas. In some embodiments, the fluid may be an ionic fluid, such as an ionic liquid or a gas.

In another aspect, a method of forming the electrofluidic device disclosed herein is provided, the method comprising, or consisting essentially of, or further consisting of: (a) depositing the first electrode and the second electrode onto the first face of the substrate; followed by (b) synthesizing CNTs onto a defined area of the first face of the substrate to produce a plurality of CNTs, which are aligned substantially perpendicular to the first face of the substrate; (c) rolling a cylindrical rolling pin onto and over the plurality of CNTs realigning the CNTs parallel to the first face of the substrate and contacting the CNTs with one or both electrodes; and (d) coating the substrate and the plurality of CNTs, which are aligned parallel to the first face of the substrate, with a polymer and etching the polymer to produce one or more reservoirs in fluid connectivity with the CNTs.

In some embodiments, a method of forming an electrofluidic device, comprises (a) depositing a first electrode and a second electrode, which is parallel to the first electrode, onto a first face of a substrate comprising the first face and a second face, which is opposite to the first face and is separated from the first face by a distance defining a thickness; (b) synthesizing CNTs onto a defined area of the first face of the substrate to produce a plurality of CNTs, which are substantially perpendicular to the first face of the substrate; (c) realigning the plurality of CNTs parallel to the first face of the substrate so that contacting the CNTs contact at least one of the first electrode and the second electrode; and (d) coating the substrate and the plurality of CNTs with a polymer and etching the polymer to produce one or more reservoirs in fluid connectivity with the CNTs. In some embodiments, the coating comprises coating the polymer on the first and the second faces of the substrate. In some embodiments, the realigning comprises rolling a cylindrical rolling pin on the first face of the substrate over the plurality of CNTs arranged in parallel to each other and substantially perpendicular to the first face of the substrate.

In some embodiments, the method further comprises, or consists essentially of, or yet further consists of the step of releasing the plurality of CNTs and connected reservoirs from the substrate. In some embodiments, the substrate is replaced with a second substrate. In some embodiments, the substrate may be coated with an electrical insulator, such as silicon-nitride, silicon oxynitride, or a silicon oxide. For example, the substrate may be a silicon nitride coated silicon substrate. In some embodiments, etching the substrate comprises photolithography and silicon micromachining. In some embodiments, coating with the polymer may comprise low pressure chemical vapor deposition. In some embodiments, coating the polymer may be performed on the first and the second face of the substrate by, for example, positioning the substrate vertically in a polymer deposition chamber, such as chemical vapor deposition chamber.

BRIEF DESCRIPTION OF THE FIGURES

FIG. 1A illustrates a fluidic device, while FIG. 1B illustrates a similar electrofluidic device. A plurality of hollow carbon nanotubes 4 having open input ends 5 and output ends 6 are on a first face of substrate 2 over aperture 3 parallel to first face of substrate 2. Polymer layer or barrier 8 is over an outer surface of carbon nanotubes 4 and the first face of substrate 2. The first face of substrate 2 includes reservoir 7 which is in fluidic connection with inner volume of nanotubes 4 through open input ends 5. The inner volume of nanotubes 4 and reservoir 7 may contain a fluid. The first face of substrate 2 includes first electrode 12, second electrode 13 and optional reference electrode 14. The electrode may be parallel to each other and the first face of substrate 2 and perpendicular to a length of nanotubes 6. A power source 15 may be provided between first electrode 12 and second electrode 13. Energy beam, such as an X-ray beam may be directed through aperture 3 on nanotubes 4. The energy beam scattered by nanotubes 4 may be detected and used for studying the dynamics of the fluid in nanotubes 4.

FIG. 2A shows horizontally-aligned CNTs 4 on a face of substrate 2 over aperture 3. The horizontally aligned CNTs 4 may be formed by rolling vertically aligned CNTs onto substrate 2.

FIG. 3 illustrates the process of rolling over a plurality of vertically-aligned CNTs 11 with a rolling pin 16 to horizontally-align them over an aperture 3 in a substrate 2. A substrate support arm 18 and rolling arm 17 facilitate the rolling process.

FIGS. 6A and 6B show the x-ray scattering results for a device in which the reservoirs are filled with the ionic $PF_6$. FIG. 6A shows the results for a device in which the ionic liquid flows through the CNTs as normal. FIG. 6B shows the scattering results for a device in which the CNTs have been closed so as to not allow passage of ionic fluid. The x-ray beams pass through the CNTs in an area of the CNT plurality located above the aperture and between reservoirs. In the closed device, a scattering pattern is seen consistent with the absence of $PF_6$, indicating the effectiveness of the polymer coating or barrier against leakage of ionic fluid there through.

FIG. 7A shows a photograph of CNT device coated with parylene ("PaN") and Pt electrodes. FIG. 7B shows average I-V curves from devices #1-4 as labeled in FIG. 7A both before and after PaN coating. This data shows that the device experiences no loss in electrical contact or conductivity upon coating. FIG. 7C shows electrical resistance of CNTs versus the electrodes shows CNTs are more conductive than 70 nm×25 μm Pt traces.

FIG. 8A illustrates small-angle X-ray scattering 1D I(q) collected at 680 eV integrated from the sector defined by the dashed white lines on the inset 2D anisotropic scattering pattern. Mean CNT diameter, d, is determined by the position in q of the center of the high-q hump, where d=2 pi/q, q is the momentum transfer vector 4 pi/lambda*sin(theta), and theta is the scattering angle. FIG. 8B illustrates graphitization measured by ratio of Raman G-band to D-band intensities (i.e., G/D) versus the mean CNT diameter determined by X-ray scattering for a set of devices fabricated.

FIGS. 9A-9C provide additional information for the fabrication process of FIG. 5. FIG. 9A shows op-down optical microscopy image of the lithographically determined patch of CNT catalyst and the X-ray transparent window made in the silicon substrate. FIG. 9B is a top-down optical microscopy image of the aligned CNTs after transformed to lying parallel with the silicon substrate (white dashed box outlines where the X-ray window is positioned beneath the CNTs. FIG. 9C is a scanning electron microscopy (SEM) image showing the aligned morphology of the CNTs.

FIGS. 10A-10C provide additional information for the fabrication process of FIG. 5. These images are collected after parylene deposition and etching of the reservoirs. FIG. 10A is a scanning electron microscopy (SEM) image of the underside of the CNT-parylene composite showing solid infiltration of the void spaces between CNTs. FIG. 10B is a top-down optical microscopy image of a representative CNT device without electrodes (gold color is the silicon nitride exposed after reactive ion etching and the blue region is the parylene that acts as a fluidic barrier. FIG. 10 C is a scanning electron microscopy (SEM) image of the edge of the CNT-parylene composite after reactive ion etching, showing the exposed CNT tips sticking out a the otherwise solid parylene matrix.

FIGS. 11A-11D illustrate the integration of the CNT device with an X-ray source. FIG. 11A is a top-down optical microscopy image of a 1×3 array of CNT devices with electrical contacts and wire bonds and liquid drops added to the reservoirs (black dashed box shows area that is magnified in next figure. FIG. 11B is a photograph showing backside view of 1×3 array of CNT devices on a chip that has been wirebonded into a ceramic dual inline package that has been customized with a laser-cut hole to allow an X-ray beam to pass through during electrical operation. FIG. 11C is a photograph of several ceramic dual inline packages hosting CNT devices mounted on a custom printed circuit board for integration into an X-ray beamline endstation (inset photograph is backside view of the circuit board showing holes for X-ray beam to pass through). FIG. 11D is a photograph of the circuit board mounted inside the vacuum chamber at an X-ray beamline endstation, where the X-rays would come from the right hand side, with an X-ray detector shown on the left hand side to collect downstream.

FIGS. 12A-12D show the electrochemical performance of a CNT device. FIG. 12A is a schematic of a device with electrodes as a reference for the optical microscopy image shown in FIG. 12B. FIG. 12B is a top-down optical microscopy image of the CNT highlighted with a black dashed box in FIG. 11A showing electrolyte liquid drop in the reservoir and contacting the counter 14 and reference electrodes 13, where electrode 12 contacts integrate with the CNTs 4, such that the inner surface of the CNT walls form together with electrode are a working electrode of the device. FIG. 12C shows cyclic voltammetry using for an electrolyte the ionic liquid 1-butyl-3-methylimidazolium tris(pentafluoroethyl) trifluorophosphate (different scan rates 5, 20, 50 mV/s shown in red, green, and blue, respectively). FIG. 12D is capacitance calculated from cyclic voltammetry measurements in FIG. 12C assuming a total surface area of the inner surfaces of the CNTs with a reference to literature values measured on flat graphene for the same electrolyte.

FIGS. 13A-G illustrate a fluidic device 1300 having vertically aligned conducting nanotubes, such as vertically aligned carbon nanotubes (VACNT), and a method of making such device. FIG. 13A shows working electrode 1304 being formed on a portion of a face 1302 of a substrate 1301. The substrate 1301 may have an aperture 1303 extending through a portion of its thickness from a face 1305, which is opposite to the face 1302. FIG. 13B shows vertically aligned conducting nanotubes 1306, such as vertically aligned carbon nanotubes, being grown on a portion of the face 1302 over the aperture 1303 and over a portion of the working electrode 1304. As such, conducting nanotubes 1306 may form an electric contact with the working electrode 1304. FIG. 13C shows masking layer 1307, which may be a polymer layer, such as a parylene layer, being deposited on the substrate 1301 on the side of the face 1302 over the working electrode 1304 and the vertically aligned nanotubes 1306. FIG. 13D shows the substrate 1301 being etched from the side of the face 1305 to extend the aperture 1303 through the entire thickness of the substrate 1301. FIG. 13E shows counter electrode 1308 and/or reference electrode 1309 being formed on portions of the face 1305 of the substrate 1301, while extending into a portion of the aperture 1303. FIG. 13F shows a portion of the masking layer 1307 over the vertically aligned conducting nanotubes 1306 is etched away exposing a top side of the nanotubes 1306 and inner volumes of their inner channels to an outside environment. FIG. 13G shows a fluid 1310, such as an electrolyte fluid, e.g. an electrolyte liquid, or an ionic fluid, e.g. an ionic liquid, is added to a portion of the aperture 1303, which becomes a reservoir. The fluid 1310 may be in electric contact with portion(s) of counter electrode 1308 and/or reference electrode 1309 extending into the aperture 1303. For adding the fluid 1310 into the aperture 1303, the substrate 1301 may be flipped over so that the face 1305 faces up and the face 1302 faces down. A zoomed in portion in FIG. 13G shows that nanotubes 1306 have sensing side 1306A (sensing ends) exposed to the outside environment and reservoir side 1306B (reservoir ends) in fluidic contact with the fluid 1310. The fluidic device 1300 may be used for sensing applications, such as detecting a chemical species in the outside environment upon a exposure of the species to the sensing side 1306A of the nanotubes 1306A.

DETAILED DESCRIPTION

Definitions

Unless otherwise specified, "a" or "an" means one or more.

The term "substantially perpendicular" as applied to nanotubes, such as carbon nanotubes, means that an alignment axis of the nanotubes deviates from a normal of a surface, such as a face of a substrate, by no more than about 10° or no more than about 5° or no more than about 3° or no more than about 2°. In many embodiments, nanotubes, such as carbon nanotubes, which are substantially perpendicular to a face of a substrate, may be perpendicular to the face of the substrate.

The term "substantially parallel" as applied to nanotubes, such as carbon nanotubes means that an alignment axis of the nanotubes deviates from being parallel to a surface, such as a face of a substrate, by no more than about 10° or no more than about 5° or no more than about 3° or no more than about 2°. In many embodiments, nanotubes, such as carbon nanotubes, which are substantially parallel to a face of a substrate, may be parallel to the face of the substrate.

As used herein, the term "about" means±20% or ±10% or ±5% or ±2% or ±1% of a numeric value to which the term applied.

This disclosure uses the terms "horizontal," "upward", "downward", "vertical" and their derivatives only for the purpose of illustrating relationship between orientations of various elements of the fluidic device. However, these terms cannot be used for limiting an absolute orientation of the device. For example, the terms "horizontally aligned" and "vertically aligned" as applied to nanotubes, such as carbon nanotubes, are respectively used only to illustrate that the nanotubes are aligned substantially parallel and substantially perpendicular to a face of a substrate. The terms "downward" and "upward" as applied to a first face and a second face of the substrate are used only to illustrate that the first face is opposite to the second face.

Although the present disclosure discusses carbon nanotubes, it may be also applicable to other conducting or semiconducting nanotubes, such as metal nanotubes, nanotubes made of conducting oxides, nanotubes made of metal chalcogenides, nanotubes made of transition metal carbides, nitrides or carbonitrides.

Modes for Carrying Out the Disclosure

Figure 1:
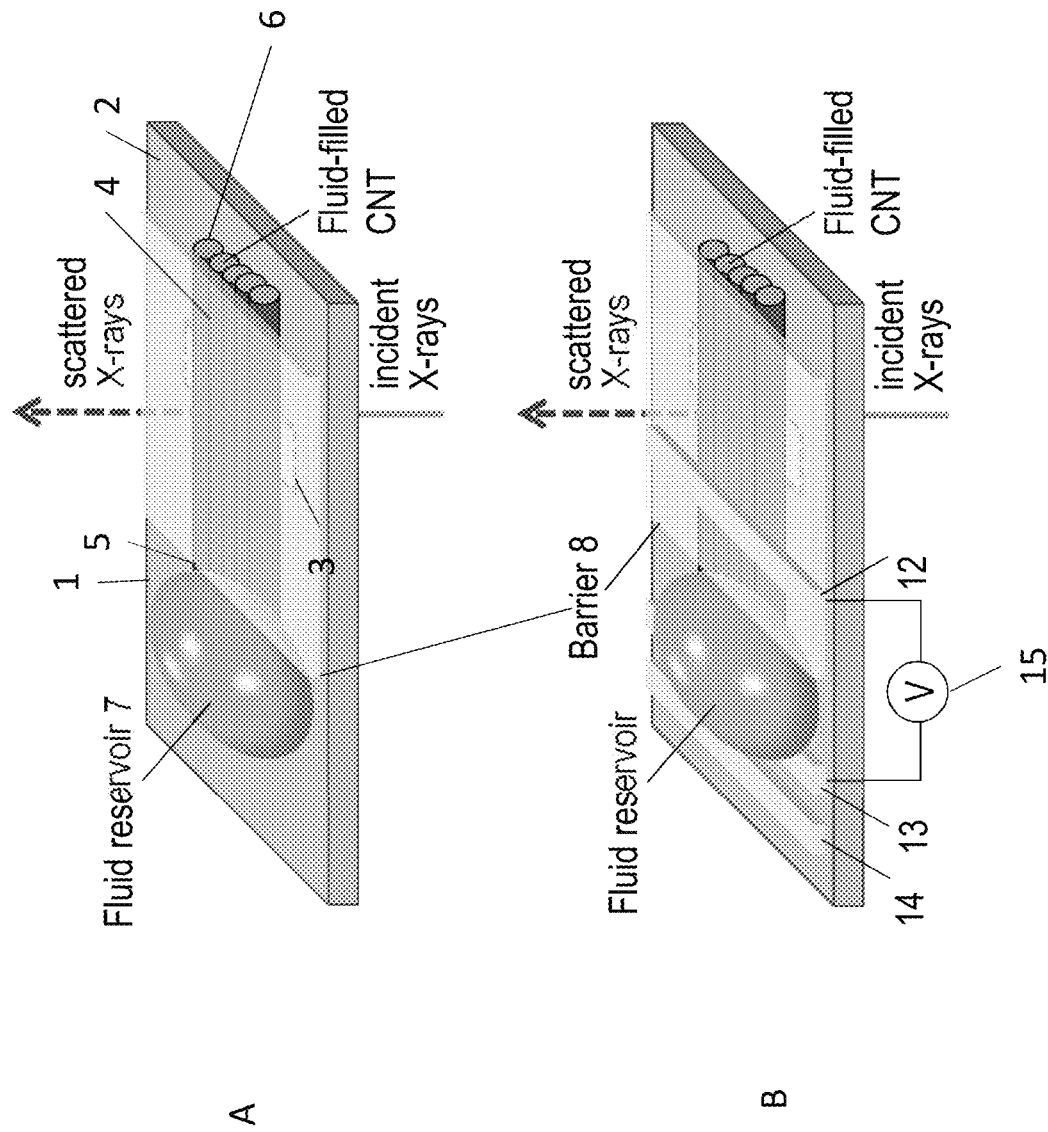

Referring to FIG. 1A, in one aspect a fluidic device is provided comprising a horizontally-aligned substrate 2 comprising an upward facing first face 1 and a downward facing second face separated by a distance defining a thickness; a first aperture 3 through the substrate 2; a first plurality 4 of equi-length, horizontally-aligned carbon nanotubes (CNTs) arranged in parallel, each CNT comprising an input end 5 and an output end 6; adjacent CNTs in contact with one another, wherein the first plurality of CNTs is a t×w array, wherein t, which represents a number of CNTs in a first direction perpendicular to the first face of the substrate, is 1 to about 5,000, or 1 to about 2000 or 1 to about 1000 or about 2 to about 3000 or about 5 to about 2000 and w, which represents a number of CNTs in a second direction parallel to the first face of the substrate, is about 5 to about 50,000 or about 10 to about 5000 or about 10 to about 4000 or about 10 to about 3000 or about 10 to about 2000.

In FIG. 1A t=1 as there is only one layer of CNTs and w=5 because the plurality is five CNTs in width. The CNTs are dense to facilitate spanning of aperture 3. The input ends 5 of the CNTs are flush with each other, as are the output ends 6, since the CNTs are of the same length. In FIG. 1A, 100% of the CNTs of the plurality 4 span the aperture 3, however the plurality 4 may be so positioned over the aperture 3 so that only a percentage of the plurality spans the aperture (see FIG. 5).

In some embodiments, the plurality 4 of CNTs may be connected at either end to a reservoir 7, which the CNTs can receive fluid from or drain fluid into. The plurality of CNTs and the fluidic device may be covered with a masking coating 8 (or barrier), such as a polymer coating, for example via chemical vapor deposition (CVD) of a masking material, such as a polymer, e.g. parylene (see FIG. 2B). The coating 8, or barrier, may be etched away to create fluid reservoirs 7 (also see FIG. 2D). Fluid reservoirs 7 may be filled with an ionic fluid, such as an ionic liquid or a gas, 9 (IL) (or gas) as shown in FIG. 2E. The ionic fluid 9 may then flow into and through CNTs which span aperture 3. The use of the fluidic device as a tool to analyze the dynamics of an ionic fluid, such as an ionic liquid or gas, inside an inner volume of CNTs is realized when an energy beam, such as an x-ray beam, is directed through the aperture 3 and through the CNTs filled with the ionic fluid, such as an ionic liquid or gas. The energy beam, such as an x-ray beam, scattered by the CNTs may be recorded by a detector 10, such as an X-ray detector, to obtain data concerning the dynamics of the ionic fluid 9 inside an inner volume of the CNTs.

In some embodiments, the fluidic device may consist essentially of polymer-coated CNTs and reservoirs and is removed from the substrate and deposited on a second substrate, optionally a second substrate that is flexible. Removal of the substrate may be accomplished by methods known to the skilled artisan, for example, those in Bui et al. "Ultrabreathable and Protective Membranes with Sub-5 nm Carbon Nanotube Pores." *Advanced Materials*. (28):28 pp. 5877.

Referring to FIG. 1B, in some embodiments, the fluidic device is an electrofluidic device comprising a first electrode 12 in contact with the device at a first point, a second electrode 13 in contact with the device at a second point, and optionally a reference electrode 14. The first point and second point for electrode contact may be any points on structures which contain the electrolytic fluid, namely CNTs and/or reservoirs. In some embodiments, the electrofluidic device may further comprise a power source, such as a potentiostat 15, for applying voltage to electrodes 12 and 13.

The substrate may comprise up to a $d^{th}$ plurality of CNTs, optionally with reservoirs connected to either end (input or output) of the plurality. For example, the substrate may further comprise a $2^{nd}$, $3^{rd}$, $4^{th}$, and up to a $500^{th}$ plurality of CNTs. In some embodiments, d is from 2 to about 10, about 10 to about 50, about 50 to about 100, about 100 to about 150, about 150 to about 200, about 200 to about 250, about 250 to about 300, about 300 to about 350, about 350 to about 400, about 400 to about 450, or about 450 to about 500.

In some embodiments, each reservoir independently has a volume between about $1.0 \times 10^{-4}$ µl and about $10 \times 10^{-4}$ µl. In some embodiments, each reservoir independently has a volume of about $3.75 \times 10^{-4}$ µl. The fluid may pin, thus reservoirs may contain a volume of the fluid greater than their rectangular volume. In some embodiments the reservoirs each have a volume capacity of about 0.1 µl to about 3 µl. In some embodiments, the volume capacity is about 1 µl.

In some embodiments, the substrate may comprise multiple pluralities of CNTs spanning multiple apertures of the substrate. Thus, the substrate may comprise a $d^{th}$ aperture through the substrate, a $d^{th}$ plurality of equi-length, horizontally-aligned carbon nanotubes (CNTs) arranged in parallel, each CNT comprising an input end and an output end; adjacent CNTs in contact with one another, wherein the $d^{th}$ plurality of CNTs is a $t_d \times w_d$ array, wherein $t_d$, which represents a number of CNTs in the $d^{th}$ plurality in the first direction perpendicular to the first face of the substrate, is from 1 to about 5,000 or 1 to about 2000 or 1 to about 1000 or about 2 to about 3000 or about 5 to about 2000 and $w_d$, which represents a number of CNTs in the $d^{th}$ plurality in the second direction parallel to the first face of the substrate, is about 5 to about 50,000 or about 10 to about 5000 or about 10 to about 4000 or about 10 to about 3000 or about 10 to about 2000.

Each $d^{th}$ plurality of CNTs has a density of CNTs independently selected from about $1 \times 10^{10}$ to about $5 \times 10^{12}$. The input ends of each $d^{th}$ plurality of CNTs flush with each other; and wherein from about 0.1% to 100% of the CNTs of the $d^{th}$ plurality span the $d^{th}$ aperture, wherein the percentage of CNTs in each $d^{th}$ plurality spanning the $d^{th}$ aperture is selected independently of the percentage of CNTs in any other plurality spanning their respective aperture.

In some embodiments, the fluidic device is an electrofluidic device comprising a first electrode contacting the device at a first point and a second electrode contacting the device at a second point.

Figure 3:
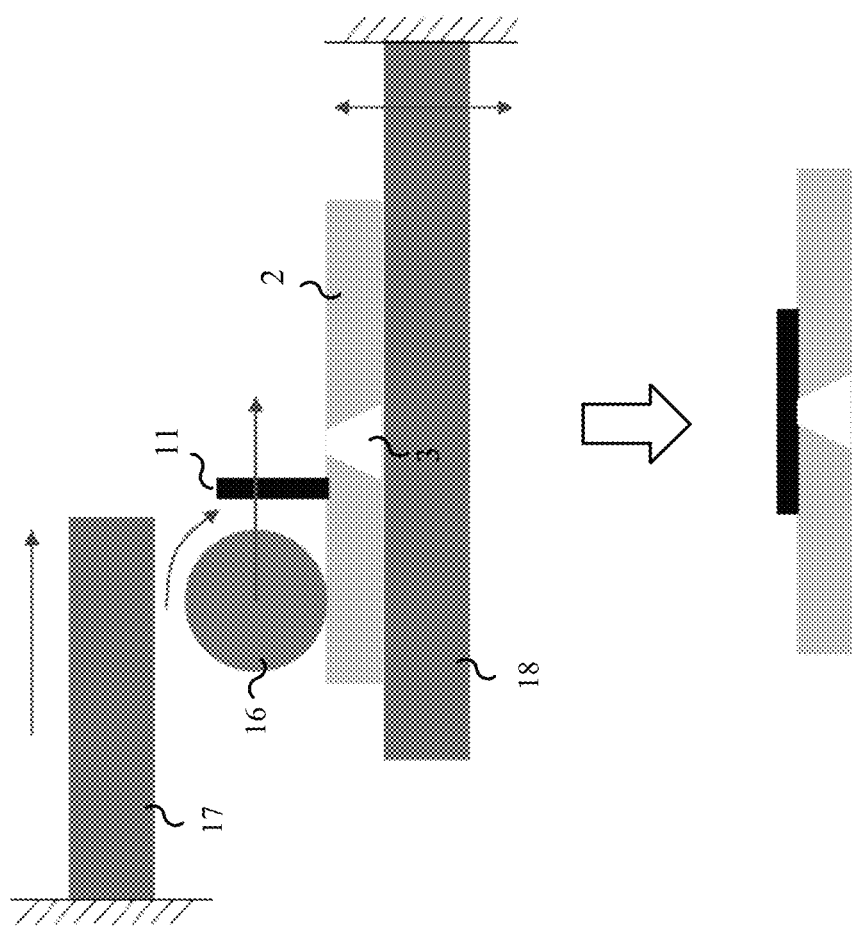
as illustrated in FIG. 3. A polymer coating 8 is deposited over the CNTs 4 and substrate 2 (FIG. 2B). A mask 19 is placed over the coating 8 (FIG. 2C) and reservoir(s) 7 are etched at the ends of the CNTs 4 (FIG. 2D) to open the ends of the CNTs 4 so that may be fluidically connected with reservoir(s) 7.

In some embodiments, realigning of carbon nanotubes, from the vertically-aligned to the horizontally-aligned CNTs of the fluidic devices may be accomplished by rolling vertically-aligned CNTs into a horizontal position on the substrate. Thus, some embodiments provide a fluidic device comprising vertically-aligned CNTs. Referring to FIG. 3, in some embodiments, the fluidic device comprises a horizontally-aligned substrate 2 comprising an upward facing first face and a downward facing second face separated by a distance defining a thickness; a first aperture 3 through the substrate; a first plurality 11 of equi-length, vertically-aligned carbon nanotubes (CNTs) arranged in parallel, each CNT comprising an input end and an output end; adjacent CNTs in contact with one another. The input ends are flush with each other, in contact with the first face of the substrate, and from about 0.1 to about 1,000 µm from the first aperture. Vertically aligned CNTs may be synthesized my methods known to the skilled artisan, and as described in Example 1.

Figure 4:
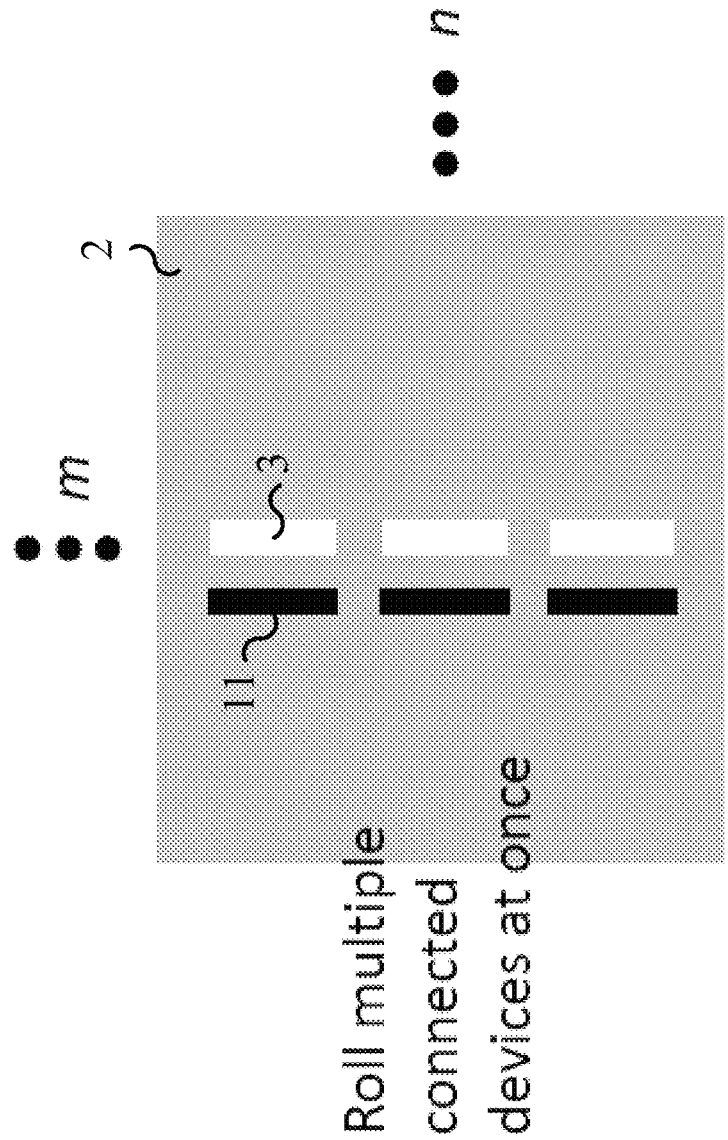
FIG. 4 illustrates the simultaneous rolling of multiple pluralities of vertically-aligned CNTs into horizontally-aligned CNTs spanning a respective aperture for each.

In some embodiments, a substrate may comprise multiple pluralities of vertically-aligned CNTs and multiple apertures which may be rolled all at once, optionally with a single rolling pin. Referring to FIG. 4, in some embodiments a fluidic device is provided comprising a horizontally-aligned substrate 2, a $d^{th}$ aperture 3 through the substrate 2, a $d^{th}$ plurality 11 of equi-length, vertically-aligned carbon nanotubes (CNTs) arranged in parallel, each CNT comprising an input end and an output end; adjacent CNTs in contact with one another. The $d^{th}$ plurality of CNTs is t CNTs thick and w CNTs wide, wherein the t and w of each $d^{th}$ plurality are selected independently from the t and w of any other plurality of CNTs. In some embodiments, the input ends of each $d^{th}$ plurality of CNTs are flush with each other, in contact with the first face of the substrate, and from about 0.1 to about 1,000 µm from the $d^{th}$ aperture.

In some embodiments, each of t or $t_d$ (the thickness of a plurality in number of CNTs stacked) is independently from 1 to about 5,000. In some embodiments, each of t or $t_d$ is independently selected from the group consisting of 1 to about 100, about 100 to about 500, about 500 to about 1,000, about 1,000 to about 2,500, and about 2,500 to about 5,000. In some embodiments, t or $t_d$ is about 1. In some embodiments, t or $t_d$ is about 2. In some embodiments, t or $t_d$ is about 3. In some embodiments, t or $t_d$ is about 4. In some embodiments, t or $t_d$ is about 5. In some embodiments, t or $t_d$ is about 6. In some embodiments, t or $t_d$ is about 7.

In some embodiments, each of w or $w_d$ (the width of a plurality in number of CNTs) is independently from about 5 to about 50,000. In some embodiments, each w or $w_d$ is independently selected from the group consisting of 5 to about 5,000, about 5,000 to about 10,000, about 10,000 to about 15,000, about 15,000 to about 20,000, about 20,000 to about 25,000, about 25,000 to about 35,000, about 35,000 to about 40,000, about 40,000 to about 45,000, about 45,000 to about 50,000, and above about 50,000. In some embodiments, each w is about 30,000 to 40,000.

In some embodiments, the thickness of each plurality of CNTs, which may be a product of t or $t_d$ and an outer diameter of an individual CNT in the plurality, is independently selected from the group consisting of about 0.5 to about 2.5 nm, about 2.5 to about 5.0 nm, about 5.0 to about 10.0 nm, about 10.0 to about 20.0 nm, and about 20.0 to about 50.0 nm and about greater than 50.0 nm. In some embodiments, the width of each plurality of CNTs, which may be a product of w or $w_d$ and an outer diameter of an individual CNT in the plurality, is independently selected from the group consisting of about 1 to about 25 µm, about 25 to about 50 µm, about 50 to about 100 µm, about 100 to about 200 µm, about 200 to about 500 µm, and about greater than 500 µm. In some embodiments, the width of each plurality of CNTs is independently selected from the group consisting of about 0.5 to about 1 µm, about 1 to about 1.5 µm, about 1.5 to about 2.5 µm, about 2.5 to about 3 µm, about 3 to about 3.5 µm, about 3.5 to about 5 µm, about 5 to about 7 µm, about 7 to about 10 µm, about 10 to about 20 µm, and about greater than 20 µm.

In some embodiments, each plurality of CNTs independently has a density from about $1 \times 10^9$ to about $5 \times 10^9$, about $5 \times 10^9$ to about $1 \times 10^{10}$, about $1 \times 10^{10}$ to about $5 \times 10^{10}$, about $5 \times 10^{10}$ to about $1 \times 10^{11}$, about $1 \times 10^{11}$ to about $5 \times 10^{11}$, about $5 \times 10^{11}$ to about $2 \times 10^{12}$, about $2 \times 10^{12}$ to about $2 \times 10^{13}$, or about greater than $2 \times 10^{13}$ $cm^{-2}$. In some embodiments, the input ends and or the output ends of the CNTs of a plurality are etched, for example, using reactive ion etching (RIE) to provide CNTs having open ends.

In some embodiments, the CNTs of a plurality have a length of about 1 µm to about 1,000 µm. In some embodiments, the CNTs of a plurality have a length of greater than about 100 µm.

In some embodiments a plurality of CNTs is comprised of individual CNTs each having an outer diameter of about 0.3 nm to about 50 nm. In some embodiments, the outer diameter is about 0.3 nm to about 0.5 nm. In some embodiments, the outer diameter is about 0.5 nm to about 1 nm. In some embodiments, the outer diameter is about 1 nm to about 2 nm. In some embodiments, the outer diameter is about 2 nm to about 5 nm. In some embodiments, the outer diameter is about 5 nm to about 10 nm. In some embodiments, the outer diameter is greater than about 10 nm.

In some embodiments the CNTs are comprised of graphene. In some embodiments, the CNTs comprise single walled CNTs. In some embodiments the CNTs comprise double-walled nanotubes (DWNTs). In some embodiments, the CNTs comprise multiwalled nanotubes (MWNTs). In some embodiments the CNT comprises in inner surface and out surface, wherein the outer surface and/or inner surface is functionalized with a chemical functional group.

In some embodiments, the CNTs a plurality are semiconducting CNTs. A plurality comprising semiconducting CNTs may be formed by methods known to the skilled artisan, for example, those in Shulaker et al. *Nature*. 2017, 547, 74-78.

In some the substrate may comprise a semiconducting material, such as silicon, or a dielectric material, such as quartz. For carbon nanotube applications, it may be preferred to use a substrate made of a material, which is compatible high temperature processes, such as with high temperature CVD processes, which are used for growing carbon nanotubes. Such compatible material may be, for example, silicon or quartz. When the substrate comprises a dielectric material, such as quartz, a deposition of a dielectric or electrically insulating layer, may not be necessary because the surface of the substrate is already dielectric. When the substrate comprises a semiconducting material, such as silicon, a dielectric (electrically insulating) layer may be deposited on a surface of the substrate to form a dielectric surface.

In some embodiments, the substrate may comprise a semiconductor material. For example, in some embodiments, the substrate may comprise silicon or germanium. In some embodiments, the substrate may comprise crystalline silicon. In some embodiments, the semiconductor, such as silicon, may be doped with a dopant. Non-limiting examples of dopant include boron, phosphorus, arsenic, and antimony. Suitable substrates are disclosed, for example, in Semiconductor Manufacturing Handbook, Second Edition by Hwaiyu Geng; and Microchip Fabrication, Sixth Edition: A Practical Guide to Semiconductor Processing by Peter Van Zant; and Dry Etching Technology for Semiconductors by Kazuo Nojiri, the entire disclosures each of which are hereby incorporated by reference.

A thickness of the substrate may vary. In some embodiments, a thickness of the substrate may be from 10 microns to 2000 microns or from 30 microns to 1500 microns or from 50 microns to 1000 microns or from 80 microns to 800 microns or any value or subrange within these ranges.

In some embodiments, one or more faces of the substrate may be coated with an electrical insulator, such as silicon nitride, silicon oxynitride or silicon oxide In some embodiments, the thickness of the electrical insulator coating, such as a silicon nitride coating, may be from about 50 to about 500 nm. In some embodiments, the thickness of the electrical insulator coating, such as a silicon nitride coating, may be from about 50 to about 100 nm. In some embodiments, the thickness of the electrical insulator coating, such as a silicon nitride coating, may be from about 100 to about 150 nm. In some embodiments, the thickness of the electrical insulator coating, such as a silicon nitride coating, may be from about 150 to about 200 nm. In some embodiments, the thickness of the electrical insulator coating, such as a silicon nitride coating, may be from about 200 to about 250 nm. In some embodiments, the thickness of the electrical insulator coating, such as a silicon nitride coating, may be from about 250 to about 300 nm. In some embodiments, the thickness of the electrical insulator coating, such as a silicon nitride coating, may be from about 300 to about 400 nm. In some embodiments, the thickness of the electrical insulator coating is from about 400 to about 500 nm.

An aperture through the substrate may be, for example, cylindrical, cubic, or conic in shape. In an embodiment, a cylindrical aperture may be from 1 to 1,500 μm in diameter. In an embodiment, a cylindrical aperture may be from 1 to 1,000 μm in diameter. In an embodiment, a cylindrical aperture may be from 1 to 200 μm in diameter. In an embodiment, a cylindrical aperture may be from 200 to 400 μm in diameter. In an embodiment, a cylindrical aperture may be from 400 to 600 μm in diameter. In an embodiment, a cylindrical aperture may be from 600 to 800 μm in diameter. In an embodiment, a cylindrical aperture may be from 800 to 1,000 μm in diameter.

In some embodiments, a cubic aperture may have a length and width each independently selected from the group consisting of about 1 to about 50 μm, about 50 to about 100 μm, about 100 to about 200 μm, about 200 to about 500 μm, about 500 to about 1,000 μm, and about 1,000 to about 5,000 μm.

In some embodiments, the aperture may be asymmetric, wherein the diameter, length, and/or with of the aperture at the first face of the substrate may be about 1 to about 10, about 10 to about 20, about 20 to about 30, about 30 to about 40, about 40 to about 50, about 60 to about 70, about 70 to about 80, about 80 to about 90, or about 90 to about 100% of the corresponding dimension at the second face of the substrate. In some embodiments, the diameter, length, and/or with of the aperture at the second face of the substrate may be about 1 to about 10, about 10 to about 20, about 20 to about 30, about 30 to about 40, about 40 to about 50, about 60 to about 70, about 70 to about 80, about 80 to about 90, or about 90 to about 100% of the corresponding dimension at the first face of the substrate.

The presence, size and or location (or approximate location) of apertures, CNTs, pluralities, or reservoirs described herein can be assessed using various imaging methods (including optical microscopy, scanning electron microscopy, scanning probe microscopy, scanning tunneling microscopy, atomic force microscopy, transmission electron microscopy, etc.); detecting analyte, particles or ions passing through pores (using mass spectrometry, secondary mass spectrometry, Raman spectroscopy, residual gas analysis, detecting Auger electrons, detecting nanoparticles using a microbalance, detecting charged species with a Faraday cup, detecting secondary electrons, detecting movement of analyte through defects, employing an analyte detector, evaluating the bubble point when submerged in a liquid, measuring the flux of gas or liquid at a given pressure differential, identifying a composition, mass, average radius, charge or size of an analyte; detecting electromagnetic radiation passing through defects; detecting electromagnetic radiation given off by analyte; and detecting electromagnetic radiation or particles back scattered from the substrate.

Figure 5:
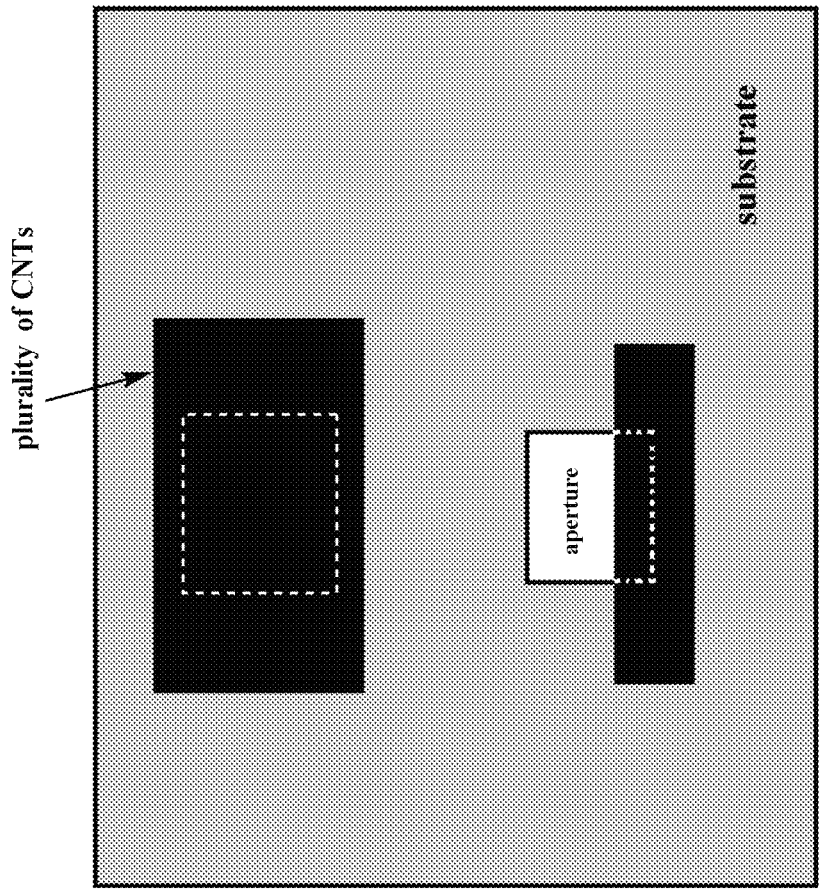
FIG. 5 illustrates 100% of a plurality of CNTs spanning an aperture (top), and a plurality in which 50% of the plurality spans the aperture.
Figure 11D:
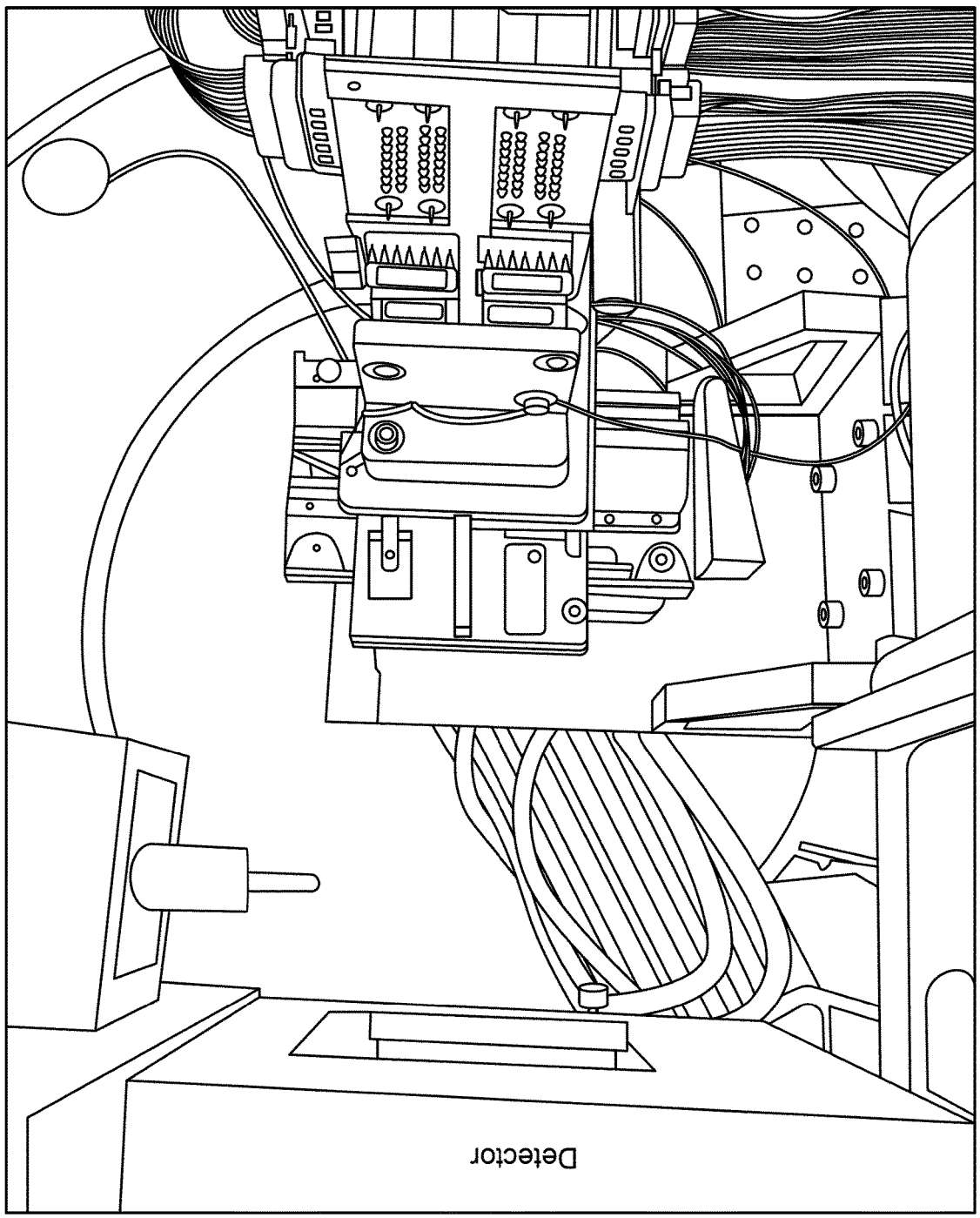

In some embodiments, 100% the CNTs of the plurality of horizontally-aligned CNTs spans the aperture (see FIG. 5, top). In some embodiments, about 50% the CNTs of the plurality of horizontally-aligned CNTs spans the aperture (see FIG. 5, bottom). In some embodiments, each plurality of CNTs independently has a percentage CNTs spanning an aperture selected from the group consisting of about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, and about 100%.

In some embodiments the device comprises a polymer coating deposited onto the CNTs and substrate. The polymer coating may be selected from parylene, for example, parylene C, N, AF-4, SF, HT, X, E, halogenated parylene, polyimide, polysulfones, polyurethane, polymethylmethacrylate (PMMA), polyglycolid acid (PGA), polylactic acid (PLA), polyethylene glycol (PEG), polylactic-co-glycolic acid (PLGA), polyamides, polyimides, polypropylene, polyethersulfones (PES), polyvinylidine fluoride (PVDF), cellulose acetate, polyethylene, polyethylene terephthalate (PET), polypropylene, polycarbonate, polytetrafluoroethylene (PTFE), polyvinylchloride (PVC), polyether ether ketone (PEEK), polycaprolactone, polydimethylsiloxane (PDMS), block co-polymers of any of these, and mixtures or composites thereof.

In some embodiments the polymer coating may have a thickness of less than 10 nm. In an embodiment, the coating may have a thickness of less than 100 nm. In an embodiment, the coating may have a thickness of less than 1,000 nm. In some embodiments, a thickness of the polymer coating may be from 5 nm to 1000 nm or from 5 nm to 800 nm or from 10 nm to 600 nm or 20 nm to 500 nm or 50 nm to 500 nm or any value or subrange within these ranges.

In some embodiments, the CNTs and/or reservoirs comprise an ionic fluid, such as an ionic liquid or gas. In some embodiments, the ionic liquid has a melting point about 175° C. In some embodiments, the ionic liquid may comprise one or more organic cations such as 1-alkyl-3-methylimidazolium, 1-alkylpyridinium, N-methyl-N-alkylpyrrolidinium, phosphonium and ammonium ions. In some embodiments, the ionic liquid may comprise one or more anions selected from simple halides, inorganic anions, for example, tetrafluoroborate and hexafluorophosphate, and large organic anions, for example, bistriflimide, triflate or tosylate. In some embodiments, the ionic liquid may comprise one or more non-halogenated organic anions such as formate, alkylsulfate, alkylphosphate or glycolate.

In some embodiments, the CNTs and/or reservoirs comprise an electrolytic fluid, such as an electrolytic liquid or gas. In some embodiments the electrolytic fluid may comprise a polar solvent, for example, water, tetrahydrofuran, ethyl acetate, acetone, dimethylformamide, acetonitrile, dimethyl sulfoxide, nitromethane, propylene carbonate, formic acid, butanol, isopropyl alcohol, n-propanol, ethanol, methanol, acetic acid. In some embodiments, the electrolytic fluid may further comprise one or more ions selected from ions of sodium, potassium, chloride, calcium, magnesium, phosphate, lithium, aluminum, strontium, hydrogen, rubidium, cesium, beryllium, barium, radium, silver, zinc, hydride, fluoride, bromide, iodide, oxide, sulfide, selenide, telluride, nitride, phosphide, arsenide, copper, iron, tin, chromium, manganese, mercury, lead, cobalt, nickel, gold, nitrate, nitrite, chromate, dichromate, cyanide, permanganate, hydroxide, peroxide, amide, carbonate, sulfate, sulfite, oxalate, phosphate, phosphite, thio sulfate, arsenate, silicate, tartrate, acetate, perchlorate, perchlorate, chlorate, hypochlorite, periodate, chlorate, chlorite, hypochlorite, iodate, hypoiodite, bromate, hypobromite, and bicarbonate.

In some embodiments, the CNTs and/or reservoirs comprise a gas. Non-limiting examples of a gas comprised by the device include $N_2$, $NH_3$, CO, $CO_2$, $O_2$, water, $SO_2$, HCl, $SF_6$, volatile organic compounds, polycyclic aromatic hydrocarbons, and noble gases.

In some embodiments, the device comprises an energy source proximal to the second face of the substrate. The energy source may be configured to direct, an energy beam, such as an X-ray beam, a neutron beam, or an electron beam, through the plurality of CNTs spanning an aperture, as shown in FIGS. 1A, 1B and 2E. In some embodiments, the device further comprises a detector to detect the energy beam, such as an X-ray beam a neutron beam or an energy beam, after its scattering from the plurality of CNTs. In some embodiments, the detector may be an X-ray detector, a neutron detector or an electron detector. In some embodiments, the detector is selected from the group consisting of UV-Vis spectroscopy, Fourier-transform infrared spectroscopy (FTIR), Raman spectroscopy, transmission electron microscope (TEM), a scanning electron microscope (SEM), x-ray absorption spectroscopy, and x-ray computerized tomography (CT).

Methods

Carbon nanotubes parallel to a face of a substrate ("horizontally-aligned carbon nanotubes") may be formed by realigning carbon nanotubes formed substantially perpendicular to the face of the substrate ("vertically-aligned carbon nanotubes"). Such realigning may be performed by for example, by rolling a pin, such as a cylindrical rolling pin over the vertically-aligned carbon nanotubes.

This disclosure also provides methods of making devices comprising horizontally-aligned CNTs. Referring to FIG. 3, in one aspect, a method of spanning an aperture 3 in a substrate 2 with horizontally-aligned CNTs is provided, comprising rolling a cylindrical rolling pin 16 on the substrate 2 towards the aperture 3 and over a plurality of vertically-aligned CNTs 11, horizontally-aligning the CNTs over the aperture 3.

Referring to FIG. 3, in another aspect, a method of making the fluidic device disclosed herein is provided, comprising rolling a cylindrical rolling pin 16 on the substrate 2 towards the aperture 3 and over a plurality of vertically-aligned CNTs 11, horizontally-aligning the CNTs over the aperture 3.

Figure 2:
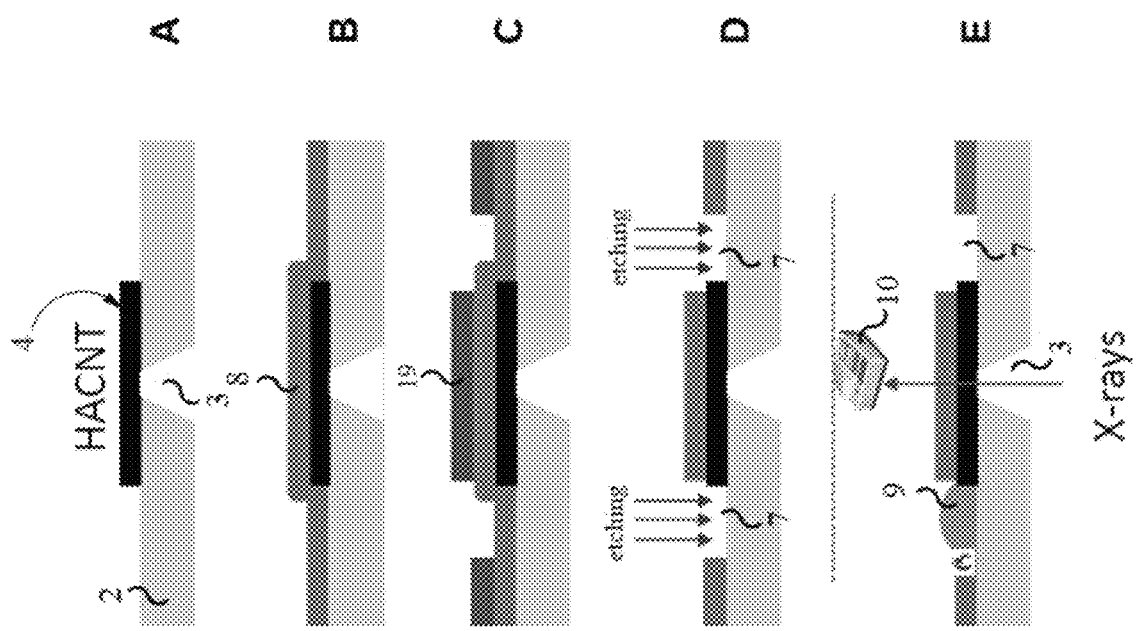
FIGS. 2A-2E illustrate methods of making (FIGS. 2A-2D) and using (FIG. 2E) the fluidic device with horizontally aligned nanotubes, such as horizontally aligned carbon nanotubes (HACNT).

Referring to FIGS. 2 and 3, in another aspect, a method of analyzing the dynamics of a fluid, such as a liquid or a gas, 9 inside an inner volume of a CNT is provided, comprising detecting scattered x-ray beams incident upon a plurality of the CNTs 4 horizontally-aligned over an aperture 3 in a substrate 2, wherein the CNTs were horizontally aligned by, for example, rolling a cylindrical rolling pin 16 (see FIG. 3) on the substrate 2 towards the aperture 3 and over a plurality of vertically-aligned CNTs 11.

In some embodiments, the methods further comprise coating the substrate and the plurality of horizontally aligned CNTs with a polymer 8 (see FIG. 2B).

In some embodiments, the methods further comprise etching the polymer coating 8 to create one or more reservoirs in fluid connectivity with an input end and/or an output end of the CNTs, as shown in FIG. 2D. In some embodiments, a mask 19 is placed between the etchant and polymer coating in select areas to form reservoirs in select areas, as shown in FIG. 2C. The etching may be, for example, reactive ion etching.

In some embodiments, the methods further comprise filling one or more reservoirs with a fluid, such as a liquid or gas, 9. In some embodiments, the fluid may be an ionic fluid, such as an ionic liquid or gas. The fluid may comprise an ionic fluid or an electrolytic fluid, for example, such as those disclosed above.

In some embodiments, a method of forming the electrofluidic device, may comprise (a) depositing the first electrode and the second electrode onto the first face of the substrate; followed by (b) synthesizing CNTs onto a defined area of the first face of the substrate to produce a plurality of CNTs, which are substantially perpendicular to the first face of the substrate; (c) realigning the plurality of CNTs parallel to the first face of the substrate and contacting the CNTs with one or both electrodes; and (d) coating the substrate and the plurality of CNTs with a polymer and etching the polymer to produce one or more reservoirs in fluid connectivity with the CNTs.

In some embodiments, synthesizing CNTs onto a defined area of a face or a substrate may involve patterning a catalyst for growing CNTs on the defined area of the face of the substrate and then growing CNTs from the patterned catalyst. In some embodiments, a catalyst for growing CNTs may be a catalyst comprising one or more transition metal, such as cobalt, nickel, iron, molybdenum or combinations thereof, e.g. a Mo/Fe catalyst.

The CNTs may be grown by exposing the patterned catalyst for example, to a carbon containing gas or a gas mixture, such as a $C_2H_2$ containing gas mixture, at an elevated temperature, such as 700° C. or above. Methods of growing aligned CNTs are disclosed, for example, in Meshot et al., Carbon, v. 159, 2020, pp. 236-246, which is incorporated herein by reference in its entirety.

In some embodiments, the electrode(s) may be deposited using a deposition technique, such as sputtering, e-beam deposition or vapor depositions. A thickness of the electrodes may vary. For example, a thickness of the electrode(s) may be from 5 nm to 500 nm or from 10 nm to 400 nm or from 20 nm to 300 nm or from 40 nm to 200 nm or any value or subrange within these ranges.

The electrode(s) may comprise a conducting material, such a metal or a conductive carbon material, such a graphite. For example, the electrode(s) may comprise one or more metals, such as titanium, gold, silver, platinum, chromium, nickel, copper, palladium, aluminum, tungsten, molybdenum, manganese or cobalt. In some embodiments, a conducting material of the electrode(s) may be a conducting material compatible with high temperature process used for growing carbon nanotubes. Examples of such compatible materials include, but not limited to platinum, molybdenum and their alloys.

In some embodiments, the electrode(s), such electrodes 12, 13 and/or 14, in FIG. 1B may be strips parallel to each other. Such strip electrodes may have a thickness from 5 nm to 1000 nm or from 10 nm to 500 nm or from 10 nm to 200 nm or any value or subrange within these ranges. A width of the strip electrodes may be from 10 nm to 1000 microns or from 100 nm to 500 microns or from 1 micron to 200 microns or from 1 micron to 100 microns or any value or subrange within these ranges.

In some embodiments, polymer coating of the device is accomplished via low pressure chemical vapor deposition. In some embodiments, low pressure chemical vapor deposition comprises orienting the substrate and fluidic device vertically in a deposition chamber so as to coat the plurality of horizontally aligned CNTs from both sides. In an embodiment, the polymer coating may be applied by dipping, spraying, sputtering, gas depositing or vapor depositing a coating material onto the substrate and CNTs. In some embodiments, the methods further comprise the step of releasing the coated plurality of CNTs and connected reservoirs from the substrate to furnish a freestanding device.

In an embodiment, the coating may be disposed on at least an area of the first face of the substrate, CNTs and/or reservoirs, at least an area of the second face of the substrate, CNTs and/or reservoirs or at least a portion of both the first face and the second face of the substrate, CNTs and/or reservoirs. For example, at least 5%, at least 20%, at least 50%, at least 65%, at least 80%, at least 90%, or at least 95% of the area of the first face and/or the second face of the substrate and the surface area of the CNTs and/or reservoirs may be covered by the coating.

Etching the polymer coated device to form reservoirs may comprise at least one of photolithography and silicon micromachining. Before deposition of electrodes and formation of the electrofluidic device, the substrate may be etched, for example, with KOH. In an embodiment, etching may include contacting the substrate with an etchant. In some embodiments the etchant may be a liquid. In some embodiments the etchant may be a gas. In some embodiments, the etching is dry etching. In some embodiments, the etching is wet etching. In some embodiments, the etching is anisotropic etching. In some embodiments, the etching is isotropic etching. In some embodiments, the etching is sputter etching. In some embodiment the etchant may comprise potassium hydroxide (KOH), sodium hydroxide (NaOH), sodium hypochlorite (NaClO), hydrogen fluoride (HF), oxidants, for example, ozone, potassium permanganate, sulfuric acid and combinations thereof and modified Hummer's solution. In an embodiment, the oxidant combines $NaNO_3$, $H_2SO_4$ and $KMnO_4$. Other strong oxidants may also be suitable and will be recognized by one having ordinary skill in the art. In an embodiment, the etching may be reactive ion etching, anisotropic etching, plasma etching, V-groove etching, ion-bombardment or irradiation, etching with ethylene diamine, etching with Keller's reagent, etching with HCl or etching with nitric acid. In an embodiment, the etching may be atmospheric dry etching.

In an embodiment, the etching may be UV-ozone etching and may include exposure of the substrate to atomic oxygen. Suitable wavelengths of UV light include, but are not limited to wavelengths below 300 nm or from 150 nm to 300 nm. In an embodiment, the intensity may be from 10 to 100 mW/cm² at 6 mm distance or 100 to 1,000 mW/cm² at 6 mm distance. For example, suitable light may be emitted by mercury discharge lamps (for example about 185 nm and 254 nm). In an embodiment, UV/ozone etching may be performed at room temperature or at a temperature greater than room temperature. In further embodiments, UV/ozone etching may be performed at atmospheric pressure (for example 1 atm) or under vacuum.

In an embodiment, the etching may be at −78 to −60° C. In an embodiment, the etching may be at −60 to −40° C. In an embodiment, the etching may be at −40 to −20° C. In an embodiment, the etching may be at −20 to 0° C. In an embodiment, the etching may be at 0 to 20° C. In an embodiment, the etching may be at 20 to 40° C. In an embodiment, the etching may be at 40 to 60° C. In an embodiment, the etching may be at 60 to 80° C. In an embodiment, the etching may be at 80 to 100° C. In an embodiment, the etching may be at 100 to 120° C. In an embodiment, the etching may be at 120 to 140° C. In an embodiment, the etching may be at 140 to 160° C. In an embodiment, the etching may be at 160 to 180° C. In an embodiment, the etching may be at greater than 180° C.

In some embodiments the etching step may be done to a substrate that has been coated as described herein. In an embodiment, only the first or only the second face of the substrate is etched. An etch stop may be used to prevent etching at either face.

In an embodiment, etching may comprise contacting the substrate with etchant for less than 1 minute. In an embodiment, etching may comprise contacting the substrate with etchant for 1 to 20 minutes. In an embodiment, etching may comprise contacting the substrate with etchant for less than 1 minute. In an embodiment, etching may comprise contacting the substrate with etchant for 1 to 3 minutes. In an embodiment, etching may comprise contacting the substrate with etchant for 3 to 9 minutes. In an embodiment, etching may comprise contacting the substrate with etchant for 9 to 12 minutes. In an embodiment, etching may comprise contacting the substrate with etchant for 12 to 15 minutes. In an embodiment, etching may comprise contacting the substrate with etchant for 15 to 18 minutes. In an embodiment, the etching may comprise contacting the substrate with etchant for greater than 18 minutes. In an embodiment, the etching may comprise contacting the substrate with etchant for greater than 40 minutes.

Example 1 herein is presented in order to more fully illustrate the preferred aspects of the present technology. The examples should in no way be construed as limiting the scope of the present technology, as defined by the appended claims. The examples can include or incorporate any of the variations, aspects or embodiments of the present technology described above. The variations, aspects or embodiments described above may also further each include or incorporate the variations of any or all other variations, aspects or embodiments of the present technology.

EXAMPLES

Example 1

Fabrication Procedure/Process for Electrical and Fluidic Carbon Nanotube Devices Silicon nitride thin film preparation: Select proper Si wafers: DSP, 300-525 μm thick, <100>, >10,000 ohm resistance if electrodes will be used. RCA cleaning if not done by vendor. Low pressure chemical vapor deposition of silicon nitride is performed as follows: Load into LPCVD chamber in the proper position along the tube. Use end wafers on either side of wafer boat. 6:1 $DCS/NH_3$ (deposition rate usually ~200 nm an hour). Target thickness is usually ~200 nm. Allow for tube to cool once run is complete and remove samples.

Backside patterning (defines window and device dimensions): Use red vacuum oven. Load wafers vertically in Teflon holder heating for one minute. Remove wafers from oven and let cool for ~10 min. Spin on photoresist. Apply photoresist AZ1518 (two full pipettes). Spin at 1000 rpm for 10 s followed by 3000 rpm for 30 s. Soft bake at 95° C. for 60 s on hotplate (alternatively use 95° C. oven for 20 min). Expose pattern using either the Heidelberg Maskless aligner or the EVG hard mask aligner. Maskless: 375 nm wavelength, 170 mJ/cm$^2$ dose. Hard mask: ~360 mJ/cm$^2$ (depends on lamp intensity but usually ~30 sec). Develop pattern. Use 1 part AZ Developer diluted with 1 part purified water. Submerge wafer and swirl by hand for 60-90 s.

Backside silicon nitride removal: Use reactive ion etching to remove nitride. Lay wafer with patterned side up, on a clean Kapton sheet in the PETS reactive ion etching (RIE) system. Run $CF_4/O_2$, 40 sccm/10 sccm, 150 W etch. Etch time depends on silicon nitride thickness but rate is usually ~100 nm/min. Complete nitride removal can be verified with nanospec measurement.

Photoresist stripping: Remove resist using acetone or PRS2000. Acetone: place wafer on spin coater and run at 3000 rpm for 30 s while applying acetone using a squirt bottle. Apply IPA in the same way for the final 5 seconds. PRS2000: dip wafer vertically in 70-80 C PRS2000 for ~10 min. Wash wafer using purified water.

Wet etching of Si: Etch wafer using KOH. Prepare enough 44% KOH solution to fully submerge wafer. Heat to 60° C. in a water bath. Fully submerge wafer in a vertical position. Etch for ~17 hours (etch time will vary depending on Si wafer thickness and exact temperature, usually is ~17 um/hr at 60° C.). Sufficient etching can be validated by looking for a lack of bubbles and/or using a microscope to view etched regions. Clean KOH from wafer. Place wafers directly into a room temperature solution of 20% acetic acid for 1 min. Put wafers in a 50° C. solution of 40% acetic acid for 1 min. Place wafers in 50° C. purified water for 10 min. Let air dry while covered by a beaker.

Patterning of electrodes on frontside: Follow the same procedure used for backside patterning/developing to generate a photolithographic pattern of the electrode layer. This step is done on the front side of the wafer. Use the alignment marks etched by the KOH to ensure proper alignment.

Deposition of electrodes: E-beam deposition of Ti/Pt. Load samples into E-beam chamber and pump down until base pressure is $3\times10^{-6}$ mTorr or below. Deposit 10-12 nm of Ti. Deposit 70-85 nm Pt.

Photoresist stripping: Remove resist using acetone or PRS2000. Acetone: place wafer vertically fully submerged in acetone until resist is gone. This method may require additional cleaning using micro-soap to remove all resist. PRS2000: dip wafer vertically in 70-80 C PRS2000 for ~10 min.

Catalyst patch patterning: Follow the same procedure used for backside patterning/developing to generate a photolithographic pattern of the electrode layer. This step is done on the front side of the wafer. Use the alignment marks patterned during the electrode deposition step to ensure good alignment. Perform two 1 min $O_2$ plasma cleans using the PETS reactive ion etching (RIE) system. 120 W, 90 sccm $O_2$.

Deposition of catalyst patch: E-beam deposition of Mo/Fe catalyst. Load samples into E-beam chamber and pump down until base pressure is $3\times10^{-6}$ mTorr or below. Deposit 30-40 nm of $Al_2O_3$. Deposit 0.05 nm of Mo. Deposit 0.55 nm of Fe. Perform 1 min $O_2$ plasma cleans using the PETS reactive ion etching (RIE) system. 52 W, 5 sccm $O_2$.

Photoresist stripping: Sonicate samples upside-down or vertically in: 1st acetone for 6-8 min, 2nd acetone for 6-8 min, isopropyl alcohol (IPA) for 6-8 min, Hot DI water for 6-8 min, then wash/spin dry in machine.

Vertically aligned CNT growth: Growth in Aixtron Black Magic. 80 mbar, top heater=700° C., bottom heater=800° C., $C_2H_2/H_2/Ar/H_2O$=4/700/380/40 sccm growth gases.

Cleave devices: Taking advantage of the KOH etched device outlines cleave down to individual devices using a diamond tipped pen.

Roll CNTs: Place individual device onto vacuum chuck in rolling machine. Take a clean rolling pin and position ahead of vertically aligned CNT blades. Pin can be cleaned with an IPA soaked cloth and then dried with a cleanroom wipe if needed prior to rolling. Lower the rolling fork until there is enough pressure to hold the chip and pin in place. Roll through the blades at a slow and steady rate. Lift up rolling fork being careful to not let the rolling pin roll back into the blades. Remove pin and device from rolling machine.

Condense CNT blade: Option 1: IPA. Fill a small beaker (~25-50 mL) with ~5 mL of IPA. Hold device with tweezers positioned with the CNT tips aimed at the IPA solution. Slowly lower the device until the edge is in the IPA and wait until the solvent wicks up into and slightly beyond the blade. Quickly remove device from beaker and allow to air dry. Option 2: Acetone. Lay device flat on a cleanroom wipe. Use a micropipette to apply ~4 μL of acetone directly to the blade. Allow to air dry.

Parylene deposition: Load devices into the parylene chamber so that they are held in place vertically allowing parylene to access both sides of blade due to the window. Can use custom chip holder for this. Include a bare Si chip in the chamber to measure deposition thickness at the end. Load 3 g of Parylene-N dimer into a foil boat and place in the vaporizer port. Insert clean chiller, seal deposition chamber and vaporizer port, turn on vacuum pump. Set the following values. Furnace: 650° C., Vaporizer: 160° C., Chamber gauge: 135, Vacuum: 12 mtorr. Pressure setpoint can be increased if base pressure never drops below 12 mtorr or if run seems to be taking longer than expected. Turn on furnace, start process and allow for pressure to drop below vacuum set point. Turn on vaporizer. Once the vaporizer reaches 160° C. and the pressure remains below the set point the run is finished (takes several days). Turn off vaporizer and furnace and allow to cool until vaporizer is below 80° C. Vent and then remove samples, remember to check final thickness on bare Si chip using Nanospec or ellipsometry (it should be 250-350 nm).

Photoresist application: Use wrinkled foil tape and the smallest size vacuum chuck to secure sample to spin coater. Spin AZ4620 resist onto device. Apply two drops (fully cover device). Spin at 500 rpm for 10 s then 4000 rpm for 30-60 s. Soft bake on 110° C. hot plate for 60-90 s.

Exposure of parylene etch pits: Use Heidelberg Maskless aligner. Align using the crosses deposed during the catalyst patterning step. Select the etch pit spacing based on the CNT blade length (or other device needs). Expose using: 375 nm wavelength, 400 mJ/cm$^2$.

Develop: Use AZ4000 developer diluted 1:3 with purified water. Place in Teflon baskets and submerge while stirring for ~90 s. Soak/rinse with purified water.

Parylene removal: Etch using the PETS reactive ion etching (RIE) system. Use $O_2$, 90 sccm, 150 W recipe in increments of 1-2 minutes until CNT blade tips are etched away. Evaluate using the optical microscope. Keep an eye on the resist layer to make sure CNTs are not exposed due to over etching (maximum etch time is ~20-25 minutes).

Resist stripping: Dip in 70-80° C. PRS2000 for 1-2 min (start with 1 min and visually inspect). Soak/rinse in purified water. Let air dry or lightly dab with cleanroom wipe being careful not to damage the device.

While certain embodiments have been illustrated and described, a person with ordinary skill in the art, after reading the foregoing specification, can effect changes, substitutions of equivalents and other types of alterations to the present technology as set forth herein. Each aspect and embodiment described above can also have included or incorporated therewith such variations or aspects as disclosed in regard to any or all of the other aspects and embodiments.

The present technology is also not to be limited in terms of the particular aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, reagents, compounds or compositions, which can, of course, vary. It is also to be understood that the terminology used herein is for the purpose of describing particular aspects only, and is not intended to be limiting. Thus, it is intended that the specification be considered as exemplary only with the breadth, scope and spirit of the present technology indicated only by the appended claims, definitions therein and any equivalents thereof.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the invention. This includes the generic description with a proviso or negative limitation removing any subject matter from the genus, regardless of whether or not the excised material is specifically recited herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims, along with the full scope of equivalents to which such claims are entitled.

What is claimed is:

1. A fluidic device comprising:
   a substrate comprising a first face and a second face, which is opposite to the first face and is separated from the first face by a distance defining a thickness;
   a first aperture through the substrate;
   a first plurality of equi-length hollow carbon nanotubes (CNTs) arranged in parallel to each other and within ten degrees of parallel to the first face of the substrate, each CNT comprising an open input end and an open output end; adjacent CNTs in contact with one another, wherein:
   the first plurality of CNTs is a t×w array, wherein t, which represents a number of CNTs arranged in a first direction perpendicular to the first face of the substrate, is 1 CNTs to about 5,000 CNTs, and w, which represents a number of CNTs arranged in a second direction parallel to the first face of the substrate, is about 10 CNTs to about 50,000 CNTs;
   a density of CNTs in the first plurality of CNTs is from about $5 \times 10^{10}$ CNTs-cm$^{-2}$ to about $5 \times 10^{12}$ CNTs-cm$^{-2}$; and
   the input ends are flush with each other;
   wherein from about 0.1% to 100% of the CNTs of the first plurality of CNTs span the first aperture.

2. The fluidic device of claim 1, further comprising:
   a d$^{th}$ aperture through the substrate,
   a d$^{th}$ plurality of equi-length hollow carbon nanotubes (CNTs) arranged in parallel to each other and parallel to the first surface of the substrate, each CNT comprising an open input end and an open output end; adjacent CNTs in contact with one another, wherein:
   the d$^{th}$ plurality of CNTs is a $t_d \times w_d$ array, wherein $t_d$, which represents a number of CNTs arranged in the d$^{th}$ plurality of CNTs in the first direction perpendicular to the first face of the substrate, is from 1 CNT to about 5,000 CNTs and $w_d$, which represents a number of CNTs arranged in the d$^{th}$ plurality of CNTs in the second direction parallel to the first face of the substrate, is about 10 CNTs to about 50,000 CNTs;
   each d$^{th}$ plurality of CNTs has a density of CNTs independently selected from about $5 \times 10^{10}$ CNTs-cm$^{-2}$ to about $5 \times 10^{12}$ CNTs-cm$^{-2}$;
   the input ends of each d$^{th}$ plurality of CNTs are flush with each other; and
   wherein from about 0.1% to 100% of the CNTs of the d$^{th}$ plurality of CNTs span the d$^{th}$ aperture, wherein the percentage of CNTs in each d$^{th}$ plurality of CNTs spanning the d$^{th}$ aperture is selected independently of the percentage of CNTs in any other plurality of CNTs spanning their respective aperture;
   wherein d is from 2 to about 500.

3. The fluidic device of claim 1, wherein the first face of the substrate comprises a first electrode and a second electrode, which is parallel to the first electrode, wherein the first and the second electrode are oriented in the second direction, wherein at least one of the first electrode or the second electrode is in contact with the first plurality of CNTs.

4. The fluidic device of claim 1, wherein the first face of the substrate comprises a reservoir containing a fluid, wherein the reservoir is fluidically connected to the input ends or the output ends of the CNTs of the first plurality of CNTs.

5. The fluidic device of claim 4, wherein the volume capacity of the reservoir is from about 0.1 µl to about 3 µl.

6. The fluidic device of claim 1, wherein the first face of the substrate comprises an electrically insulating layer.

7. The fluidic device of claim 1, wherein a characteristic dimension of the first aperture comprising at least one of a diameter of the first aperture or a length of the first aperture is from about 0.1 to about 1,000 µm.

8. The fluidic device of claim 1, further comprising a polymer coating over the CNTs, substrate, and optionally reservoirs.

9. The fluidic device of claim 1, wherein an inner volume of the first plurality of CNTs contain a fluid.

10. The fluidic device of claim 9, further comprising an energy source configured to direct an energy beam through the first aperture on the first plurality of CNTs and one or more X-ray beam detectors configured to detect the energy beam after scattering from the first plurality of CNTs.

11. The fluidic device of claim 1, wherein the length of the CNTs in the first plurality of CNTs is between about 0.1 to about 1,000 µm.

12. A method of forming a fluidic device comprising:
    forming a first aperture though a substrate comprising a first face and a second face, which is opposite to the first face is separated from the first face by a distance defining a thickness;
    depositing on the first face of the substrate a plurality of equi-length, hollow carbon nanotubes (CNTs) arranged in parallel to each other and substantially perpendicular to the first face of the substrate; and
    realigning the plurality of CNTs, parallel to the first face of the substrate over the aperture.

13. The method of claim 12, wherein the realigning comprises rolling a cylindrical rolling pin on the first face of the substrate towards the aperture over the plurality of CNTs arranged in parallel to each other and within ten degrees of perpendicular to the first face of the substrate.

14. A method using the device of claim 1, comprising:
    directing an energy beam through the first aperture in the substrate on the first plurality of CNTs, wherein an inner volume of the first plurality of CNTs contains a fluid; and
    detecting the energy beam after scattering from the first plurality of CNTs.

* * * * *